United States Patent
Browning et al.

(10) Patent No.: US 8,378,010 B2
(45) Date of Patent: Feb. 19, 2013

(54) PROTEIN STABILIZED LATEX POLYMER EMULSIONS, METHODS OF MAKING, AND ADHESIVES CONTAINING SUCH EMULSIONS

(75) Inventors: James D. Browning, Columbus, OH (US); Bhima R. Vijayendran, Kuala Lumpur (MY)

(73) Assignee: Battelle Memorial Institute, Columbus, OH (US)

( * ) Notice: Subject to any disclaimer, the term of this patent is extended or adjusted under 35 U.S.C. 154(b) by 524 days.

(21) Appl. No.: 12/529,360

(22) PCT Filed: Mar. 10, 2008

(86) PCT No.: PCT/US2008/056425
§ 371 (c)(1),
(2), (4) Date: Nov. 2, 2009

(87) PCT Pub. No.: WO2008/112644
PCT Pub. Date: Sep. 18, 2008

(65) Prior Publication Data
US 2010/0099802 A1     Apr. 22, 2010

Related U.S. Application Data

(60) Provisional application No. 60/894,067, filed on Mar. 9, 2007.

(51) Int. Cl.
*C08L 89/00* (2006.01)
*C08L 31/00* (2006.01)
*C09J 189/00* (2006.01)

(52) U.S. Cl. .............................. 524/25; 524/26; 524/556
(58) Field of Classification Search .................... 524/26, 524/25, 556
See application file for complete search history.

(56) References Cited

U.S. PATENT DOCUMENTS

| | | | | |
|---|---|---|---|---|
| 2,685,571 | A | * | 8/1954 | Stinchfield et al. .............. 524/25 |
| 3,793,244 | A | * | 2/1974 | Megee et al. .................. 524/447 |
| 4,395,499 | A | * | 7/1983 | Rosenski et al. ............... 523/206 |
| 4,607,089 | A | | 8/1986 | Riley et al. |
| 4,812,550 | A | * | 3/1989 | Erickson et al. .............. 527/201 |
| 4,855,338 | A | | 8/1989 | Erickson |
| 6,051,258 | A | | 4/2000 | Kantor |

OTHER PUBLICATIONS

International Search Report dated Jun. 6, 2008.

* cited by examiner

*Primary Examiner* — Michael M Bernshteyn
(74) *Attorney, Agent, or Firm* — Dinsmore & Shohl LLP

(57) ABSTRACT

A method of forming a stable latex polymer emulsion is provided which includes mixing one or more monomers including polymerizable acid monomers, esters, and unsaturated monomers with water and a soy protein. The emulsion is then polymerized and may be formed into adhesive compositions having improved water resistance and mechanical strength.

5 Claims, 13 Drawing Sheets

PROTEIN STABILIZED LATEX POLYMER EMULSIONS, METHODS OF MAKING, AND ADHESIVES CONTAINING SUCH EMULSIONS

CROSS-REFERENCE TO RELATED APPLICATIONS

This application is the National Stage Entry of International Application No. PCT/US2008/056425, filed Mar. 10, 2008, which claims the benefit of U.S. Provisional Application Ser. No. 60/894,067, filed Mar. 9, 2007.

The invention relates to the stabilization of latex polymer emulsions with soy proteins, and to adhesives formed from the protein-stabilized latex emulsions.

Latex polymers are used as packaging and wood adhesives in different end uses. It is estimated that over one billion pounds of latex polymers are used per year in the United States. Conventional latexes based on vinyl acetate and acrylics have some technical deficiencies such as poor water and heat resistance and marginal adhesion on low energy plastic substrates.

Polymeric colloids such as partially hydrolyzed polyvinyl alcohol (PVOH), hydroxy ethyl cellulose (HEC) and others are used in the production of polyvinyl acetate (PVAc), polyacrylate and styrene butadiene (SBR) emulsion polymers. One of the important technical requirements for these polymeric stabilizers is the ability to emulsify and stabilize vinyl acetate, acrylic and styrene monomers during the emulsion polymerization process. These hydrocolloids also provide stability to the latex polymers by acting as a protective colloid. However, one problem is that the main functionality available in current protective colloids based on PVOH and HEC is the secondary hydroxyl group, which is not very reactive for further reaction with crosslinking agents.

Proteins, including soy proteins, have been used in conjunction with various reactive monomers to form latexes used as paper coatings. See, U.S. Pat. Nos. 4,607,089; 4,812,550; and 4,855,338.

Accordingly, there remains a need in the art for an improved method of stabilizing latex polymers which results in products having improved adhesive properties.

Embodiments of the present invention meet that need by providing a method which includes the addition of soy protein to latex emulsions during polymerization and/or the back addition of soy protein to the emulsions after polymerization.

According to one aspect of the present invention, a method of forming a stable latex polymer emulsion is provided which includes providing a monomer selected from vinyl acetate, ethylene, dioctyl maleate (DOM), acrylic and methacrylic acid, styrene, butadiene and combinations thereof; mixing one or more of the monomers with water and a soy protein to form an emulsion; and polymerizing the emulsion. By "stable latex emulsion," we mean that the emulsion contains a stabilizing protein which lowers the interfacial tension of the two phases of the emulsion (dispersed and continuous phases). By "soy protein," we mean a soy protein isolate.

Preferably, the emulsion has a solids content of from about 40 to 60%.

In one embodiment, the emulsion is polymerized by adding a cross linking agent to the emulsion which is selected from isocyanates, epoxies, and melamines.

The method also preferably includes adding a soy-based anionic surfactant to the emulsion.

An initiator is also preferably added to the emulsion. Preferred initiators include t-butyl hydroperoxide and azo initiators such as azonitriles.

In a preferred embodiment, the method includes adding a soy protein to the latex emulsion after polymerization.

The resulting stable latex polymer emulsion comprises a polymer selected from a copolymer of ethylene and vinyl acetate, poly (dioctyl maleate), polyacrylate, polymethacrylate, copolymers of styrene and butadiene, and combinations thereof; water; and a soy protein. The stable latex polymer emulsion may be used to form an adhesive having improved adhesive strength.

In another embodiment of the invention, a method of forming a stable latex polymer emulsion is provided comprising providing a vinyl acetate monomer; mixing the monomer with water and a soy protein to form an emulsion; and polymerizing the emulsion to form a latex.

We have found that the back addition or physical blending of soy protein to post-polymerized latex emulsions, i.e., adding a soy protein to the emulsion after polymerization, significantly improves the adhesive performance of the material.

We have also found that the addition of soy protein to the latex emulsions during polymerization helped to stabilize the latex emulsion and delayed phase separation. Depending on the desired application, the soy proteins may be added during polymerization, after polymerization or both during and after. The soy proteins used may be the same or different, depending on the desired end use.

Accordingly, it is a feature of the invention to provide a method of making a stable polymer latex emulsion containing a soy protein, and to adhesives formed from the stabilized latex emulsions having improved adhesive strength. Other features and advantages of the invention will be apparent from the following description, the accompanying drawings, and the appended claims.

Figure 1:
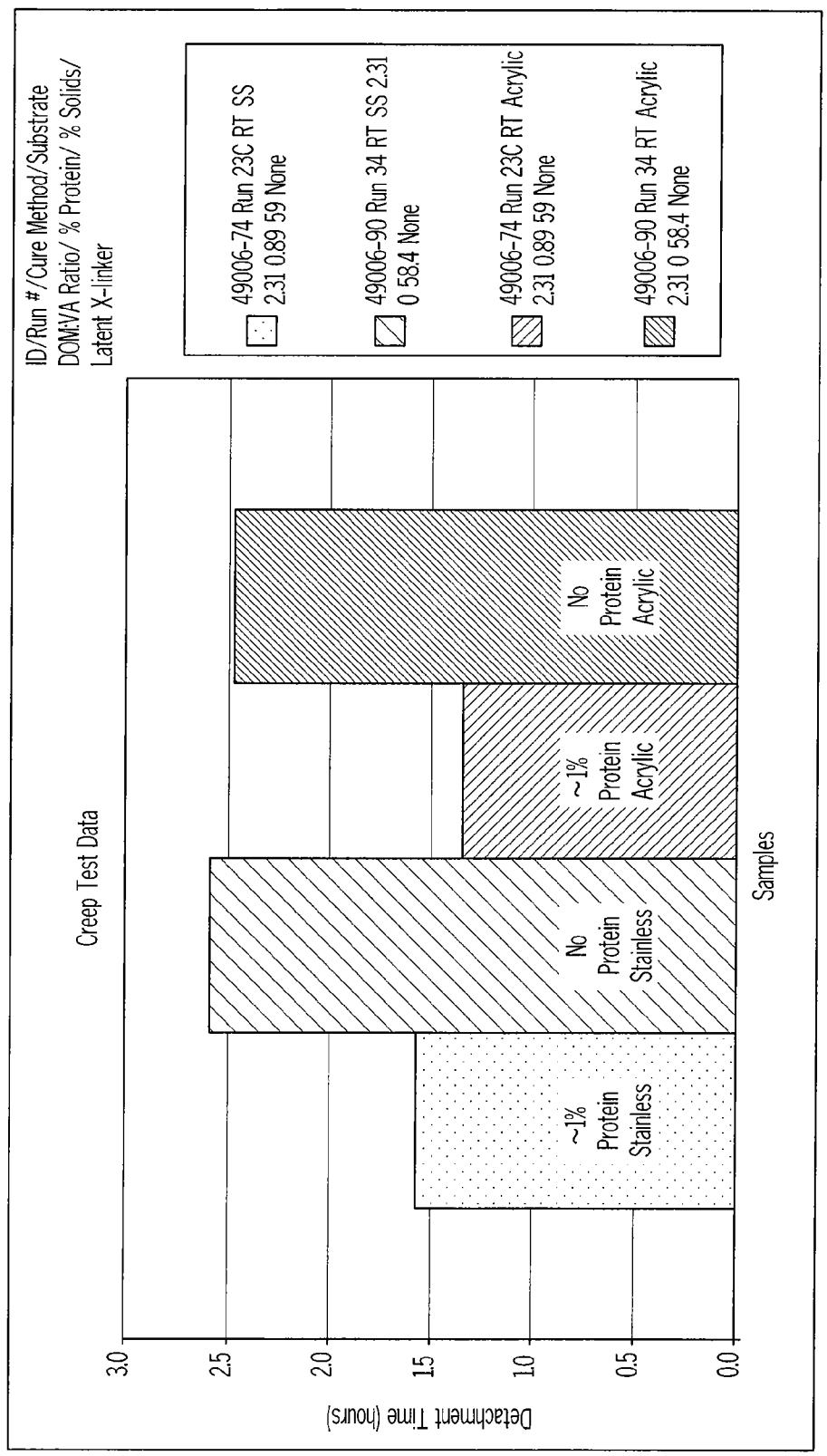
FIG. 1 is a graph illustrating the bond strength of latex emulsions prepared with and without protein.

The present invention provides a method of making stabilized latex polymer emulsions for use in adhesive applications which have been stabilized with a soy protein during and/or after polymerization. Such soy protein stabilizers may be used in place of polymeric stabilizers currently in use.

The method of the present invention utilizes amine and carboxyl functionality available in the soy protein molecule for the preparation of latex polymers. These functional groups are reactive with a variety of common crosslinking agents and also self-crosslink when exposed to mild heating.

A schematic of one aspect of the invention is shown below.

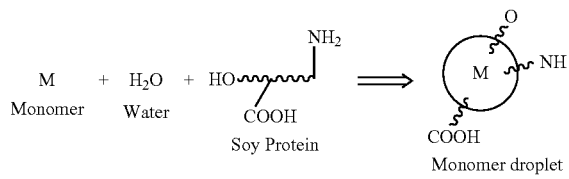

Monomers which are suitable for use in the invention include polymerizable acid monomers, esters, and various other unsaturated monomers which are well known in the art. Examples include, but are not limited to, vinyl acetate, dioctylmaleate triallylcyanurate, butyl acrylate, acrylic acid, methacrylic acid, maleic acid, fumaric acid, itaconic acid, crotonic acid, acetic acid, and their esters. Other esters include ethyl acrylate, ethyl methacrylate, methyl methacrylate, isopropyl acrylate, isopropyl methacrylate, decyl acrylate, lauryl methacrylate, and benzyl acrylate.

In a typical reaction, stable vinyl acetate homopolymer and vinyl acetate-dioctyl maleate terpolymers are prepared at 40 to 45% solids using a combination of a soy surfactant and soy protein isolates. Suitable soy protein isolates are commercially available from Protein Technologies, International, St. Louis, Mo. (DuPont) and include Pro-Cote® (PC) 4200, PC 150, PC 2500, PC 2560, PC 5000, FC 950, PC 5000, PC 950 and Supro 710. These protein isolates are generally derived from defatted soy flour using conventional separation methods. Both acid and neutralized forms of the isolate may be used. Preferably, the soy protein isolate comprises a soy protein having an average molecular weight of from about 1500 to 200,000 Daltons. The isolate preferably has a particle size distribution of between less than 5 to about 900 microns. Further, the protein isolate comprises ethylenylically unsaturated molecules having from 2 to 20 carbon atoms.

Suitable soy surfactants are also commercially available from Polartech Additive, Inc.) and include Actrasol MY75, an anionic surfactant based on sulfated soybean oil methyl ester. Others include Actrasol OY75, Actrasol C and other sulfated oils with a HLB of <12, as these sulfated fatty acid esters are more oil soluble or dispersible and prevent aggregation of the vinyl acetate micelles during polymerization.

The resulting latexes exhibit good stability comparable to commercial latex emulsions prepared with hydroxy ethyl cellulose and polyvinyl alcohol stabilizers, and exhibit a higher glass transition temperature (Tg) for the homopolymer latex and increased tensile strength of protein stabilized samples upon exposure to 80° C., due to self-crosslinking of the soy protein and polymer.

The method of the present invention may also include the preparation of stable vinyl acetate homopolymer and acrylic copolymer latexes at 55% solids. Such homopolymer latexes have improved water resistance and wood bonding properties under Type I wood testing protocol compared to conventional PVAC homopolymer and polymeric isocyanate (PMDI) crosslinked emulsions. The copolymers have good adhesion properties on low energy plastic substrates. Upon mild heating (80-100° C.), the latexes self-crosslink and show improved water resistance.

The stabilized latexes of the present invention also exhibit the ability to crosslink with external crosslinkers such as polymeric isocyanates, epoxy resins, melamines, and the like. We have found that the amine and carboxyl functionality present in soy protein is very reactive with a variety of crosslinking agents such as phenolic resins, isocyanates, etc. For example, soy protein-based finger joining wood adhesives take advantage of the fast reaction between functional groups in soy protein and phenol resorcinol formaldehyde resin at room temperature. PVAC and acrylic latex stabilized with soy protein protective colloid can be further reacted through the functional groups in the protein with typical crosslinking agents to impart improved water and heat resistance adhesives having superior strength and adhesion properties.

In order that the invention may be more readily understood, reference is made to the following examples which are intended to illustrate the invention, but not limit the scope thereof.

EXAMPLE 1

Tests were performed to determine the water solubility limits of selected proteins (all commercially available from Protein Technologies, International) as described in Table 1 below:

TABLE 1

Candidate Proteins Evaluated

| Protein | Molecular Weight | Water Solubility | Issoelectric Point | Percent Processing Aids |
|---|---|---|---|---|
| PC 4200 | High | Does not require addition of alkali to dissolve. | 4.3-4.5, | 2.5 |
| PC 150 | High | Limited at neutral pH ~20% soluble following alkalization | 4.3-4.5, | No |
| PC 2500 | Medium | Limited, requires addition of alkali to make water soluble | 4.3-4.5, | 2-2.5 |
| PC 2560 | Medium | | 4.3-4.5, | None listed |
| PC 5000 | Low | Limited, requires addition of alkali to make water soluble | 4.3-4.5, | None listed |
| FC 950 | ~1,500 | Limited | 4.3-4.5, | None listed |

Protein Solubility Evaluation

Proteins were tested for water solubility. Aqueous mixtures of proteins (3 w/w %) were prepared and filtered through 0.45-micron filters to remove any insoluble material. It is noted that any insoluble material smaller than 0.45 microns would also pass through the filter as part of the percent soluble portion. Aliquots of the respective filtrates were taken to dryness and weighed to determine the percent soluble fraction of each material (reported as percent solids).

PC 4200, PC 5000, and FP 950 showed the greatest water solubility of the tested proteins. PC 4200 is an alkali treated product, hence, better water solubility is expected. The solubility of PC 5000 (about 2.5%) was somewhat unexpected since data suggest limited solubility without alkalization. See Table 2 below.

TABLE 2

Soy Protein Solids Determination After Filtration*

| Sample # | % Solids | pH | Solution Comments: (24 Hours Post Preparation) |
|---|---|---|---|
| Polyvinyl alcohol | 2.8520 | 5.99 | Clear solution to separation noted |
| Polyvinyl alcohol | 2.8487 | | Clear solution upon dissolution of PVOH prior to filtration |
| Polyvinyl alcohol | 2.8636 | | |
| Average | 2.8548 | | |
| PC-150-1 | 0.1944 | 4.41 | Protein did not dissolve, 3 phase separation |
| PC-150-2 | 0.2037 | | |
| PC-150-3 | 0.1826 | | |
| Average | 0.1936 | | |
| FP 950-1 | 2.47 | | |
| FP 950-2 | 2.48 | | |
| FP 950-3 | | | |
| PC-2560-1 | 0.2487 | 4.29 | Protein did not dissolve, 3 phase separation |
| PC-2560-2 | 0.2661 | | |
| PC-2560-3 | 0.2551 | | |
| Average | 0.2567 | | |
| PC-4200-1 | 2.6689 | 9.5 | Most of this protein dissolved, 2 phase separation |
| PC-4200-2 | 2.6408 | | Bottom phase undissolved solids; top phase mostly clear with some suspended fines. Supernatant clear once filtered |
| PC-4200-3 | 2.6614 | | |
| Average | 2.6537 | | |
| PC-5000-1 | 2.486 | 6.35 | Most of this protein dissolved, 2 phase separation |
| PC-5000-2 | 2.5050 | | |
| PC-5000-3 | 2.4878 | | |
| Average | 2.4929 | | |

*Triplicate analysis at 3 weight percent, protein filtered thru 0.45 micron filter to remove insoluble materials Relative to preparing soy-based latex adhesives, the results also indicate that the solubility limits for the tested proteins in latex adhesive systems may be limited to less than 3%. However, the protein loading can be increased by incorporating soy protein as a dispersed excipient, either during or after polymerization.

Evaluation of Emulsification Efficacy

Proteins PC 4200 and PC 5000 were screened to provide pertinent information about emulsion efficacy and propensity for gelation in the presence of vinyl acetate, acrylates and styrene monomers.

Screening was accomplished by mixing proteins PC 4200, PC 5000 and/or polyvinyl alcohol with water and various monomers. Following preparation, samples were sonicated for 10 minutes to initiate the emulsion formation and were then maintained at room temperature for 24 hours. During this period, samples were monitored for visual changes in viscosity, gelation and changes in pH. Monitoring was continued for an additional 24 hours after heating the samples to 60° C. The data and experimental test matrix associated with these formulations are shown in Tables 3 to 6 below.

TABLE 3 pH Change of Monomer/Protein Blends with Time
(PC 4200, ~1.5% Solutions)

| Vinyl acetate | Butyl acrylate | Styrene | Bis-ethyl-hexyl maleate (DOM) | PC 4200[1] (%) | PVOH 203[2] (%) | Water (%) | T = 0 | T = 5 min. RT | T = 10 min. RT | T = 30 min. RT | T = 60 min. RT | T = 3 Hrs. RT | T = 24 Hrs. RT | T = 1 Hrs. @ 60 C. | T = 24 hr After heat cycle |
|---|---|---|---|---|---|---|---|---|---|---|---|---|---|---|---|
| 41.7 | | | | 1.8 | | 56.7 | 9 | 7 | 7 | 7 | 7 | 7 | 7 | 5 No gel | 5 Viscous |
| | 47.2 | | | 1.6 | | 51.2 | 9 | 7 | 7 | 7 | 7 | 7 | 7 | No gel | 7 No gel |
| | | 47.2 | | 1.6 | | 51.2 | 9 | 7 | 7 | 7 | 7 | 7 | 7 | No gel | 7 No gel |
| | | | 47.2 | 1.6 | | 51.2 | 9 | 7 | 7 | 8 | 8 | 8 | 7 | No gel | 7 No gel |
| 37.7* | 7.1 | | 2.4 | 1.6 | | 51.2 | 9 | 7 | 7 | 7 | 7 | 7 | 7 | 6 No gel | 5 Viscous |
| 37.7* | 7.1 | | 2.4 | 1.4 | 0.16 | 51.2 | 7 | 7 | 7 | 7 | 7 | 7 | 7 | 6 No gel | 6 No gel |

*Vinyl acetate added as monomer blend

[1] Added as 3% aqueous solution

[2] Added as 3% aqueous solution

TABLE 4 pH Change of Monomer-Protein Blends with Time
(PC 4200, ~5% Solutions)

| Vinyl acetate** | Butyl acrylate | Styrene | Bis-ethyl-hexyl maleate (DOM) | PC 4200[1] (%) | PVOH 203[2] (%) | Water (%) | T = 0 | T = 5 min. RT | T = 10 min. RT | T = 30 min. RT | T = 60 min. RT | T = 3 Hrs. RT | T = 24 Hrs. RT | T = 1 Hrs. @ 60 C. | T = 24 hr After heat cycle |
|---|---|---|---|---|---|---|---|---|---|---|---|---|---|---|---|
| 40.0 | | | | 5.4 | | 54.6 | 10 | 9 | 9 | 9 | 9 | 9 | 8 | 6 Gelled | 6 Gelled |
| | 45.5 | | | 4.9 | | 49.6 | 10 | 7 | 10 | 10 | 10 | 10 | 9 | No gel | 9 No gel |
| | | 45.5 | | 4.9 | | 49.6 | 10 | 9 | 10 | 10 | 10 | 10 | 9 | No gel | 9 No gel |
| | | | 45.5 | 4.9 | | 49.6 | 10 | 9 | 9 | 9 | 9 | 9 | 9 | No gel | 9 No gel |
| 36.4* | 6.8 | | 2.3 | 4.9 | | 49.6 | 10 | 9 | 9 | 9 | 9 | 9 | 8 | 7 Gelled | 6 Gelled |
| 36.6* | 6.9 | | 2.3 | 4.4 | 0.15 | 49.7 | 9 | 8 | 8 | 8 | 8 | 8 | 7 | No gel | 7 No gel |

*Polyvinyl alcohol
**Vinyl acetate added as monomer blend
[1]Added as 3% aqueous solution
[2]Added as 3% aqueous solution

TABLE 5 pH Change of Monomer-Protein Blends with Time
(PC 5000, ~1.5% Solutions)

| Vinyl acetate | Butyl acrylate | Styrene | Bis-ethyl-hexyl maleate (DOM) | PC 5000[1] (%) | PVOH 203[2] (%) | Water (%) | T = 0 | T = 5 min. RT | T = 10 min. RT | T = 30 min. RT | T = 60 min. RT | T = 3 Hrs. RT | T = 24 Hrs. RT | T = 1 Hrs. @ 60 C. | T = 24 hr After heat cycle |
|---|---|---|---|---|---|---|---|---|---|---|---|---|---|---|---|
| 41.7 | | | | 1.8 | | 56.6 | 6 | 6 | 6 | 5 | 5 | 5 | 5 | 5 No gel | 5 No gel |
| | 47.2 | | | 1.6 | | 51.2 | 6 | 6 | 6 | 6 | 5 | 5 | 6 | No gel | 6 No gel |
| | | 47.2 | | 1.6 | | 51.2 | 6 | 5 | 5 | 5 | 6 | 6 | 6 | No gel | 6 No gel |
| | | | 47.2 | 1.6 | | 51.2 | 6 | 6 | 6 | 6 | 6 | 6 | 6 | No gel | 6 No gel |
| 37.7* | 7.1 | | 2.4 | 1.6 | | 51.2 | 6 | 5 | 5 | 5 | 5 | 5 | 5 | 5 Gelled | 5 No gel |
| 37.7* | 7.1 | | 2.4 | 1.4 | 0.16 | 51.2 | 5 | 5 | 5 | 5 | 5 | 5 | 4 | No gel | 5 No gel |

*Vinyl acetate added as monomer blend
[1]Added as 3% aqueous solution
[2]Added as 3% aqueous solution

TABLE 6 pH Change of Monomer-Protein Blends with Time
(PVOH, 1.5% Solutions)

| Vinyl acetate | Butyl acrylate | Styrene | Bis-ethyl-hexyl maleate (DOM) | PVOH 203 (%) | Water (%) | T = 0 | T = 5 min. RT | T = 10 min. RT | T = 30 min. RT | T = 60 min. RT | T = 3 Hrs. RT | T = 24 Hrs. RT | T = 1 Hrs. @ 60 C | T = 24 hr After heat cycle |
|---|---|---|---|---|---|---|---|---|---|---|---|---|---|---|
| 44.4 | | | | 1.7 | 53.9 | 4 | 4 | 4 | 4 | 4 | 4 | 4 | 4 | 4 No gel |
| | 50.0 | | | 1.5 | 48.5 | 4 | 5 | 4 | 4 | 4 | 4 | 4 | No gel | 4 No gel |
| | | 50.0 | | 1.5 | 48.5 | 4 | 4 | 4 | 4 | 4 | 4 | 4 | No gel | 4 No gel |
| | | | 50.0 | 1.5 | 48.5 | 4 | 4 | 4 | 4 | 4 | 4 | 4 | No gel | 4 No gel |
| 40.0* | 7.5 | | 2.5 | 1.5 | 48.5 | 4 | 4 | 4 | 4 | 4 | 4 | 4 | 4 | 4 No gel |

*Vinyl acetate added as monomer blend

The results show that vinyl acetate appears to increase the propensity for protein gelation in the presence of a caustic, such as sodium hydroxide. In contrast, a non-alkali-treated protein, such as PC 5000, does not appear to have the same predisposition for gelation in combination with vinyl acetate. Polyvinyl alcohol shows no tendency toward gelation regardless of monomer or monomer combination.

Emulsion Polymerization via In-situ addition of Soy Protein

Based on the solubility and emulsion data above, both PC 4200 and PC 5000 were used in the preparation of soy protein-based emulsions. Additional emulsions were prepared using FP 950 protein. Subsequent emulsions were prepared using Supro 710 protein due to commercial unavailability of FP 950.

The procedure used a commercial emulsion polymerization recipe for the preparation of latex adhesives based on the copolymerization of vinyl acetate (VA), dioctyl maleate (DOM) and a small quantity of triallylcyanurate (TAC) (as a crosslinker) in the presence of a redox-based catalyst system based on tert-butyl hydroperoxide and included formulations prepared with and without the in-situ addition of soy protein.

Formulations prepared without soy protein served as controls samples toward evaluating adhesive properties of the protein-based formulations. Latex emulsions prepared with this procedure are normally used in packaging. This procedure, referred to as Method 1/Formulation 1 hereafter, is shown below.

Method 1 Emulsion Polymerization via In-situ Addition of Soy Protein* (*Protein solution added with monomer mixture during Step 1)
Formulation:

| Solution | Composition | Amount | Total |
|---|---|---|---|
| Reducer Delay (SFS) | SFS | 2.33 g | |
| | deionized water | 67 g | |
| | sodium acetate | 0.72 g | 70 g |
| Monomer Delay | VAM | 287 g | |
| | DOM | 670 g | |
| | TAC | 0.9 g | |

Initial Charge
1. 730 g deionized water
2. a) 1.665 g Cellosize QP-300 (100%)
   b) 5.44 g Natrosol 250 LR (100%)
   c) 9.5 g Igepal CO-887
   d) 14 g Igepal CO-630

| Delay Charges Pump Rate (ml/min.) | Time (min.) | Material | Added amount (g) |
|---|---|---|---|
| 0.3 | 240 | Reducer as needed to maintain slight reflux | 70 |

Polymerization Instructions
1. Purge reactor with $N_2$ and charge initial surfactant mixture. Heat to 65° C., then pump in monomer mixture at 260 RPM.
2. Add 0.1 g ferrous sulfate (1%) and 3.60 g tBHP (70%).
3. Add 2.0 g SFS delay and watch for initiation (5-10 minutes). Reaction temperature should rise to no higher than 80° C. with reflux.
4. Maintain slight reflux with SFS flow, about 80° C. for about 4-5 hours. Agitation rate will need to be increased gradually to 500 RPM depending on product viscosity.
5. Check free DOM at 3 hour mark. Add 0.5 g 70% tBHP in 10 g deionized water. Also add 3 g VAM. Let heat for 30 minutes and check free DOM. If higher than 0.5%, add another 1 g tBHP (70%) in 10 g deionized water and 1 g VAM. If the DOM is still high, add 0.01 g ferrous sulfate 1% solution.
6. Cool and add solution of 0.9 g of sodium bicarbonate in 10 g of deionized water.

The initial experiment performed as a control (without protein) used the above latex emulsion recipe (Method 1). The reaction resulted in a milky white emulsion with excellent stability and tack. Subsequently, emulsions prepared with this recipe (Table 7, Runs 4-12) in the presence of soy protein products PC 4200 and PC 5000 were generally unstable or gelled emulsions.

At this point, due to the unstable nature of emulsions prepared with PC 4200 and PC 5000, these soy-based protein products were eliminated in favor of FP 950 and ProCote 710.

Prior to preparing emulsions with FP 950, the Method 1 recipe was altered slightly to improve the stability of soy/latex emulsions. Actrasol MY75 (an anionic surfactant based on sulfated soybean oil methyl ester) was substituted for Igepal CO880 as the surfactant in the formulation.

The modified procedure, referred to as Method 2 hereafter, as described below provided stable emulsions in the presence of FP 950 and Supro 710. An experimental summary of runs performed utilizing both Methods 1 and 2 with the various proteins is shown in Table 7.

Method 2. Procedures for Preparation of Solutions for the Polymerization of Vinyl
Acetate Homopolymer
Preparation of reducer solution, Run 2 (Sodium formaldehyde sulfoxide, SFS-Solution 1)
Add high purity water (38.18 grams), sodium formaldehyde sulfoxide (2.66 grams) and sodium acetate (0.410 grams) to suitable sized bottle. Lightly hand mix to obtain complete dissolution, about 5 minutes. Subsequently, solution is added to reaction mixture by drop-wise addition with funnel over about 2 hours.
(Note: This will cause a mild exotherm, if added slowly to control).
Preparation of monomer solution, Run 2 (Solution 2)
Add vinyl acetate directly to reaction flask as detailed in Step 4 of General Polymerization Procedure on Page 2.
Preparation of stabilizer/surfactant mixture, Run 2 (Solution 3) (Note: The amount of each ingredient listed varies according to the polymerization batch size.
1. Add stir bar to suitable size container and tare
2. Add 290 grams of supernatant from previously prepared Supro 710 or other protein mixture, to container. (Assuming that the protein mixture contains~3 weight percent protein, this would afford 281.3. grams of water and 8.7 grams of protein)
3. While stirring, add Cellosize QP 300 (0.95 grams) and Natrosol 250LR (3.10 grams) at room temperature
4. Heat to 60 C while stirring and hold for about 10 minutes, solution will go clear
5. Cool to room temperature and add required makeup water lost through evaporation
6. Add surfactants, Igepal C0887 (5.41 grams) and Actrosol MY 75 (10.66 grams).
7. Mix gently to avoid foaming and incorporation of air
8. Cap and hold for addition to reaction flask
9. Use make up water required for adjusting solids to 50% to rinse container when this solution is added to reaction flask.
Preparation of initiator mixture (Solution 4)
Add t-butyl peroxide (neat) directly to reaction flask. Add ferrous sulfate as 1 weight percent aqueous solution. No other preparation required.
Preparation of protein solution
1. Add 475 grams deionized water to suitable sized tared container
2. Add 25 grams Supro 710 slowly while mixing with overhead stirrer
3. Once all protein has been added, began heating to 66 C and hold for 30 minutes
4. Cool to room temperature and add make up water that may have been lost through evaporation
5. Once cooled, centrifuge 30 minutes at 3500 rpms
6. Remove supernatant as required for use during polymerization Method 2, Continued General Polymerization Procedure for Preparation of Vinyl Acetate Homopolymer with Protein
1. Fit 2-liter flask with overhead stirrer, heating mantle, dropping funnel and condenser
2. Purge flask with argon
3. Add argon purged surfactant solution or surfactant-protein mixture and commence heating to 60 C
4. At 55-60 C slowly start addition of argon purged vinyl acetate over about 40 minutes with moderate stirring
5. Stir at fairly high rate for 5-10 minutes then reduce stirring level to moderate speed
6. Add Ferrous sulfate
7. Add first aliquot of t-butyl peroxide
8. Start drop-wise addition of SFS solution ~1 drop/5 seconds. You will see immediate exotherm and the temperature will slowly rise to 65-70° C. Because of the exothermic nature of the reaction, at this point it is helpful to turn off or reduce the temperature of the heating mantle to aid in temperature control. (Note that boiling point of vinyl acetate is 72° C. and if near this temperature the mixture tends to bump even with stirring, hence best to stay below 70° C. until all SFS acetate is added)
9. Following addition of SFS solution (about 2 hours), add second aliquot of t-butyl peroxide
10. Increase temperature to 80° C. and hold for 3 hours
11. Cool reaction to room temperature and add 10 grams of a 1 percent sodium bicarbonate solution
12. Bottle reaction product and weigh
13. Add 1 gram of Troysan 174 as preservative and bactericide More detailed experimental test summaries, specific to emulsions prepared with Actrosol and FP 950 and Supro 710 using Method 2 are shown Tables 7A-7G following Table 7. These tables show the weight percentages of ingredients contained in each formulation, the weight percent solids and the ratio of DOM to vinyl acetate and were used to evaluate adhesive performance, as discussed below. The additional formulations shown in Table 7 were done for scale-up and to test reproducibility of the emulsion procedure.

The effects of monomer concentration, monomer ratio, and protein addition, both before and after polymerization, were evaluated. Additional tests were made to enhance the tack of these adhesive latex systems through the use of both protein reactive cross-linking agents and by the latent addition of protein to control formulations prepared without protein. Test conditions and procedures used for preparing samples and for adhesive and mechanical testing are described below. This data is graphically illustrated in FIGS. 1-13.

Evaluation of Adhesive Properties

The associated tack and adhesive properties of these emulsions, with and without protein, were determined by static creep load evaluation or by Instron mechanical testing under lap shear conditions on stainless steel and acrylic substrates. Test conditions and procedures used for preparing respective test samples for mechanical and adhesive testing are described below.

Room Temperature Cure Procedure A
Clean/sand bonding area (1' square)
Coat 1-inch square area of substrate (6 mils, wet)
Air dry overnight (16-18 hours)
Bond under 10 PSI
Hold at RT for 16-18 hours in CT room
Mark bond lines and place in CT Room under hanging load of 227 grams
Monitor creep at 30-minutes for the first hour, hourly for the next 7 hours and then at 24 hour intervals for the next 262 hours or until failure.

Thermal Cross-linking Procedure B (Pre-bond)
Clean/sand bonding area (1" square)
Coat 1-inch square area of substrate (6 mils, wet)
Air dry overnight (16-18 hours) in CT room
Heat in conventional oven at 70 C for 4 hours
Bond under 10 PSI
Hold at RT 16-18 hours in CT room
Heat in conventional oven at 70 C for 4 hours
Mark bond lines and place in CT room under hanging load of 227 grams
Monitor creep at 30-minute intervals for the first hour, hourly for the next 7 hours and then at 24 hour intervals for the next 262 hours or until failure.

Thermal Cross-linking Procedure C (Post Bond)
Clean/sand bonding area (1" square)
Coat 1-inch square area of substrates (6 mils, wet)
Air dry overnight (16-18 hours)
Bond under 10 PSI
Hold at RT 16-18 hours in CT room
Heat in conventional oven at 70 C for 4 hours
Mark bond lines and place in CT room under hanging load of 227 grams
Monitor creep at 30-minute intervals for the first hour, hourly for the next 7 hours and then at 24 hour intervals for the next 262 hours or until failure.

Glutaric Dialdehyde Crosslinking Procedure D
Crosslink appropriate quantity of sample for testing
Hold overnight while mixing lightly via roller mill.
Clean/sand bonding area (1" square)
Coat 1-inch square area of substrates (6 mils, wet)
Air dry overnight (16-18 hours) in CT room
Bond under 10 PSI
Hold at RT for 16-18 hours in CT room
Mark bond lines and place in CT Room under hanging load of (227 grams).
Monitor creep at 30-minute intervals for the first hour, hourly for the next 7 hours and then at 24 hour intervals for the next 262 hours or until failure.

Isocyanate Crosslinking Procedure E
Crosslink appropriate quantity of sample for testing
Hold overnight while mixing lightly via roller mill.
Clean/sand bonding area (1" square)
Coat 1-inch square area of substrates
Air dry overnight (16-18 hours) in CT room
Bond under 10 PSI
Hold at RT for 16-18 hours in CT room
Mark bond lines and place in CT Room under hanging load of (227 grams).
Monitor creep at 30-minute intervals for the first hour, hourly for the next 7 hours and then at 24 hour intervals for the next 262 hours or until failure.

The experimental results and data relative to these tests are discussed in the following sections.

Static Creep Tests

The ability of adhesives to maintain a fixed bond between various substrates under a hanging load for a given period of time is an effective method utilized to measure adhesive performance. Such tests, which measure the time to failure or "disbondment" of coupons under given shear conditions, are often referred to as Static Creep Tests. A typical set-up includes two adhered substrates, known as a lap shear coupon hanging from a rod or support, with a known a weight attached to one end.

The data shown in FIG. 1 illustrate that the addition of protein as an in situ additive during polymerization negatively affects the bond strength in comparison to an identical formulation prepared without protein. This occurs with both substrates tested (stainless steel or acrylic). This may be occurring because the protein is interfering with the polymerization process in such a way that the average molecular weight of the resulting polymer is reduced, resulting in a tacky polymer with less cohesive strength. While it would be possible to improve the tack of these formulations by increasing the percent solids, it was noted that the formulations exemplified in FIG. 1 are approaching 60 percent solids, which is near the upper stability limit for latex emulsions.

The ability to increase the cohesive strength of protein-based emulsions by thermally crosslinking (no cross-linking agent added) soy-based latex emulsions as thin films deposited on stainless steel and acrylic substrates was also evaluated. This was accomplished by applying a thin layer of the emulsions of interest to both acrylic and steel coupons (substrates). The first set of samples was incubated for 4 hours at 70° C. to crosslink the polymer matrix. Following incubation, the samples were bonded together and subjected to static creep testing. The second set of samples was bonded prior to incubation and then subjected to the same test procedure.

Figure 2:
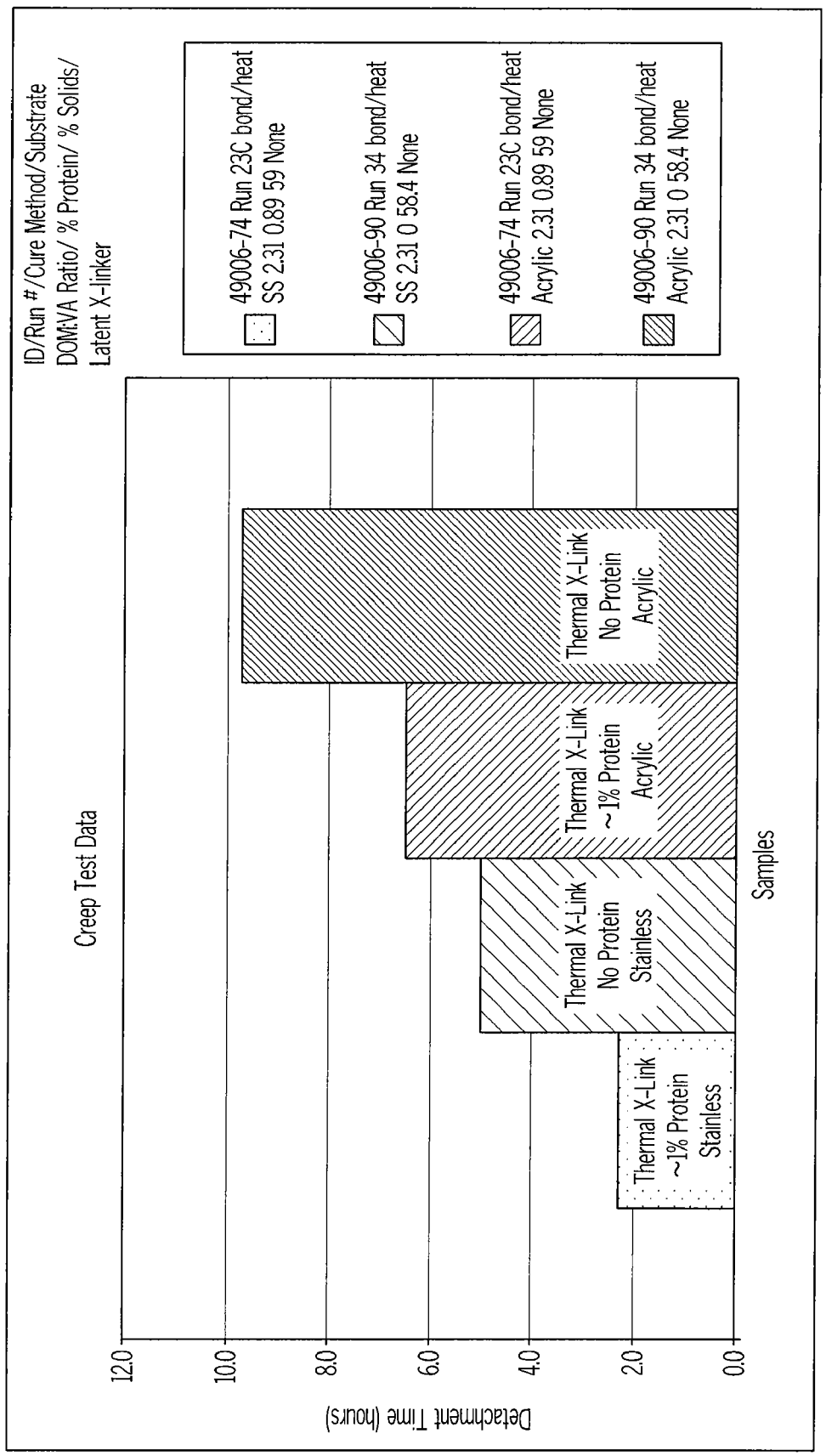
FIG. 2 is a graph illustrating the bond strength of thermally crosslinked latex emulsions prepared with and without protein.
Figure 3:
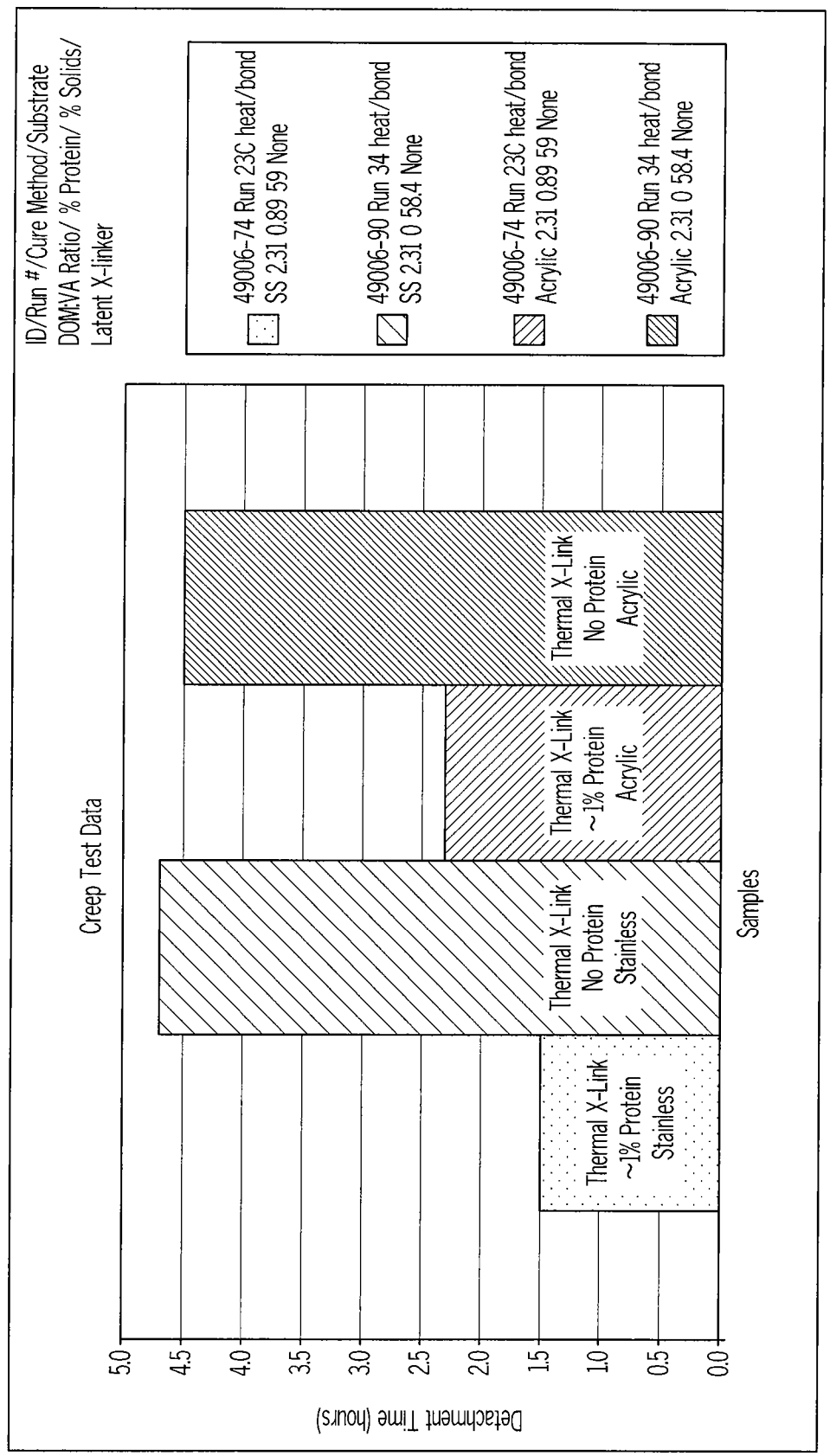
FIG. 3 is a graph illustrating the bond strength of thermally crosslinked latex emulsions prepared with and without protein.

Test results, as shown in FIGS. 2 and 3, revealed reduced cohesive strength for samples containing soy protein FP 950 in comparison to identical controls without protein. This occurs similarly on both substrates, whether coupons were assembled before or after incubation. Additional tests were directed at enhancing the tack of soy latex adhesive systems through the use of protein reactive cross-linking agents. The two crosslinking agents evaluated during the course of this program were an isocyanate (Bayhydur 7063) and glutaric dialdehyde. The data shown in FIG. 4 illustrate the effect of the addition of crosslinkers to emulsions containing about 1 percent protein (FP 950) incorporated into the monomer mixture during polymerization.

Figure 4:
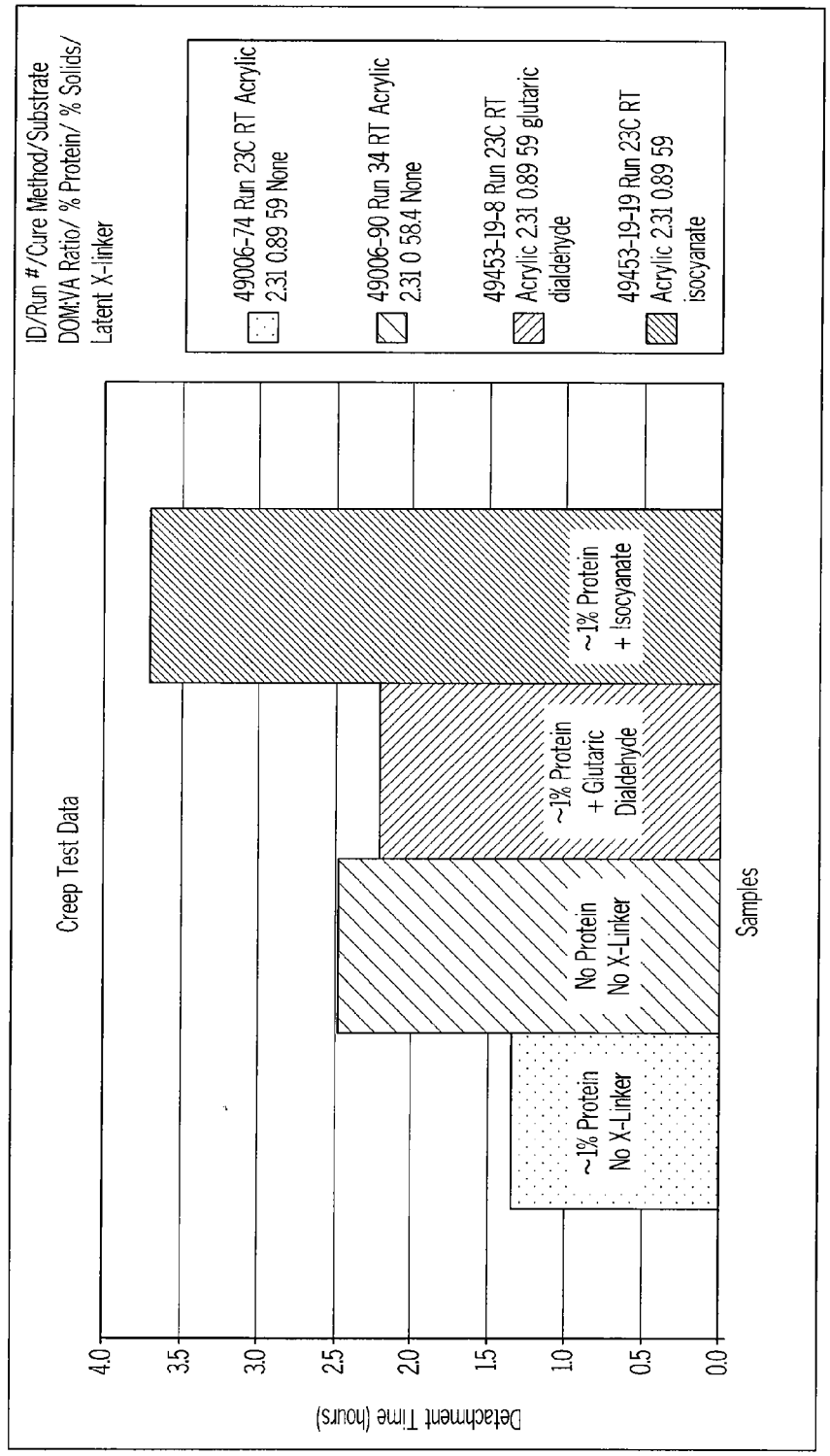
FIG. 4 is a graph illustrating the bond strength of chemically crosslinked latex emulsions prepared with and without protein on acrylic.

As shown in FIG. 4, a protein based formulation without crosslinker disbonded from acrylic in approximately 1.3 hours. Comparative analogs of this protein formulation subsequently crosslinked with either isocyanate or glutaric dialdehyde, detached (failed) in 2.2 and 3.7 hours, respectively. On acrylic and under static load shear conditions, this represents a significant increase in time to failure.

Figure 5:
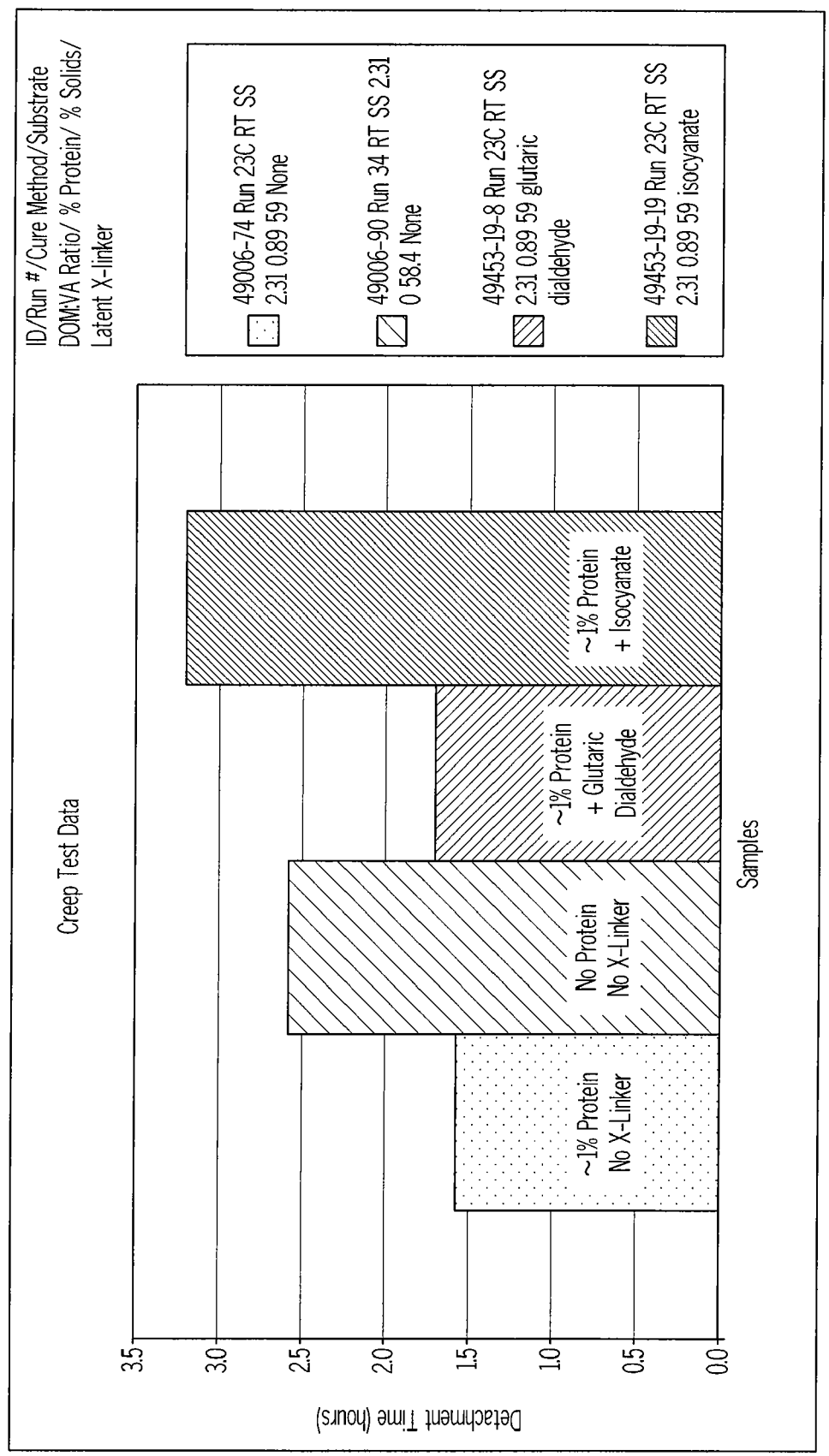
FIG. 5 is a graph illustrating the bond strength of chemically crosslinked latex emulsions prepared with and without protein on stainless steel.
Figure 6:
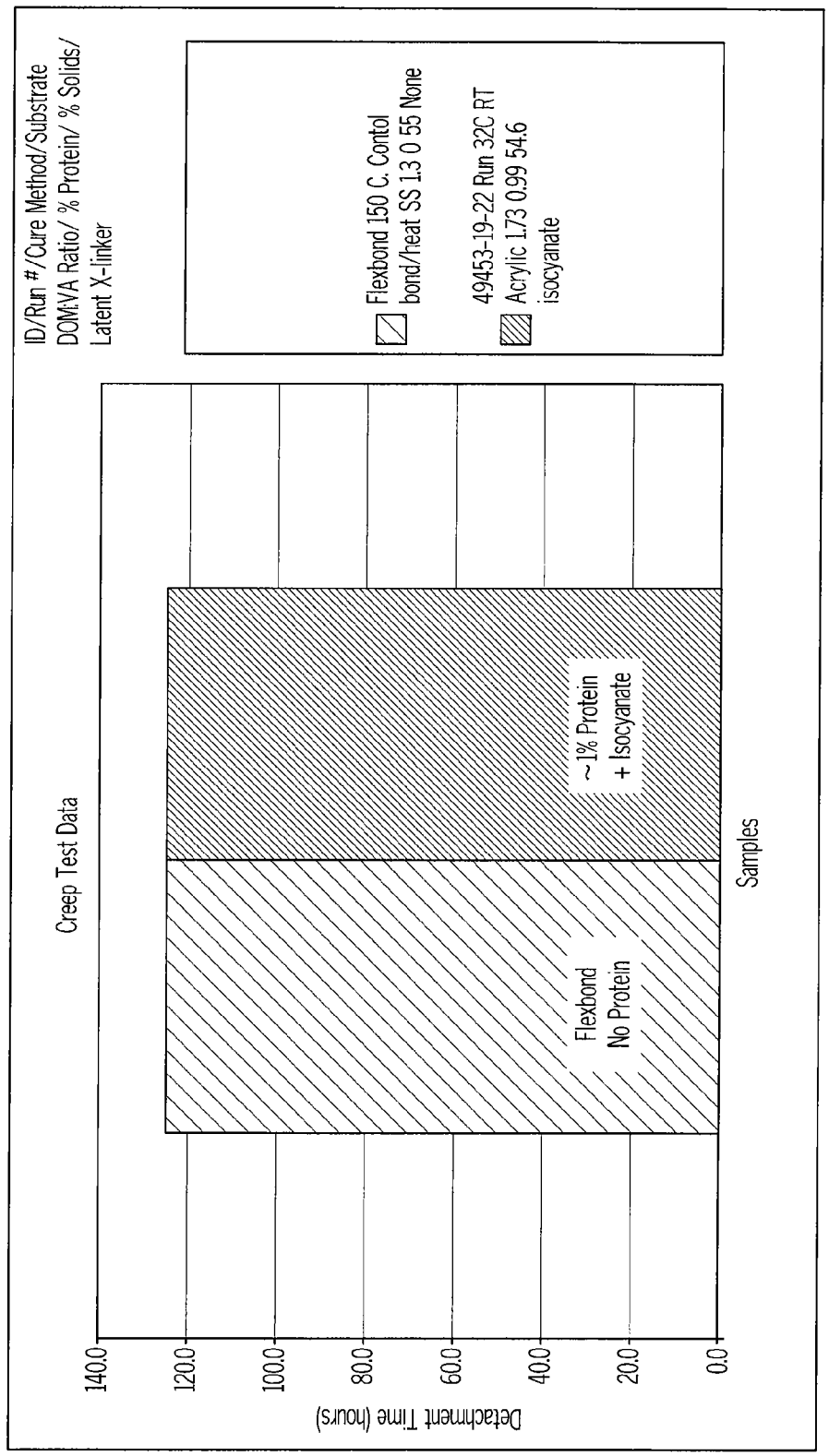
FIG. 6 is a graph illustrating the bond strength of the latex emulsion of the present invention including a protein compared with a commercial latex formulation.

Moreover, by comparing the time to failure between a protein free formulation (49006-90, FIG. 4) containing the same percent solids and proportion of DOM/VA as the formulation crosslinked with isocyanate (49453-19) it is apparent that the addition of isocyanate markedly improves the bond strength. On stainless steel, only the isocyanate cross-linked specimens showed enhanced adhesive performance (FIG. 5).

The final comparison of the static load creep data was made to determine if any of the protein-based formulations would compare favorably to Flexbond 150, a commercial latex emulsion produced by Air Products. This was accomplished by electronically filtering the data to choose coupons, regardless of substrate, that remained attached for a greater or an about equivalent amount of time as the commercial product. The data set was then filtered a second time to include only formulations containing the same percent solids as the Flexbond 150. The data shown in FIG. 6 revealed that Run 32, which is a soy protein-based emulsion crosslinked with isocyanate, is comparable to the commercial formulation.

Instron Evaluation of Bond Strength

This test method was used for quantifying the breaking load of test specimens under shear conditions and for determining the comparative shear strength of adhesive lap joint specimens under specified conditions of preparation and testing. The Instron Model TTCM1-3 was used for the tests. Its characteristics were: Cross-head speed=0.5 inches/minute, 200 pound load cell @ 20 pounds full scale, chart speed=1 inch per minute.

Figure 7:
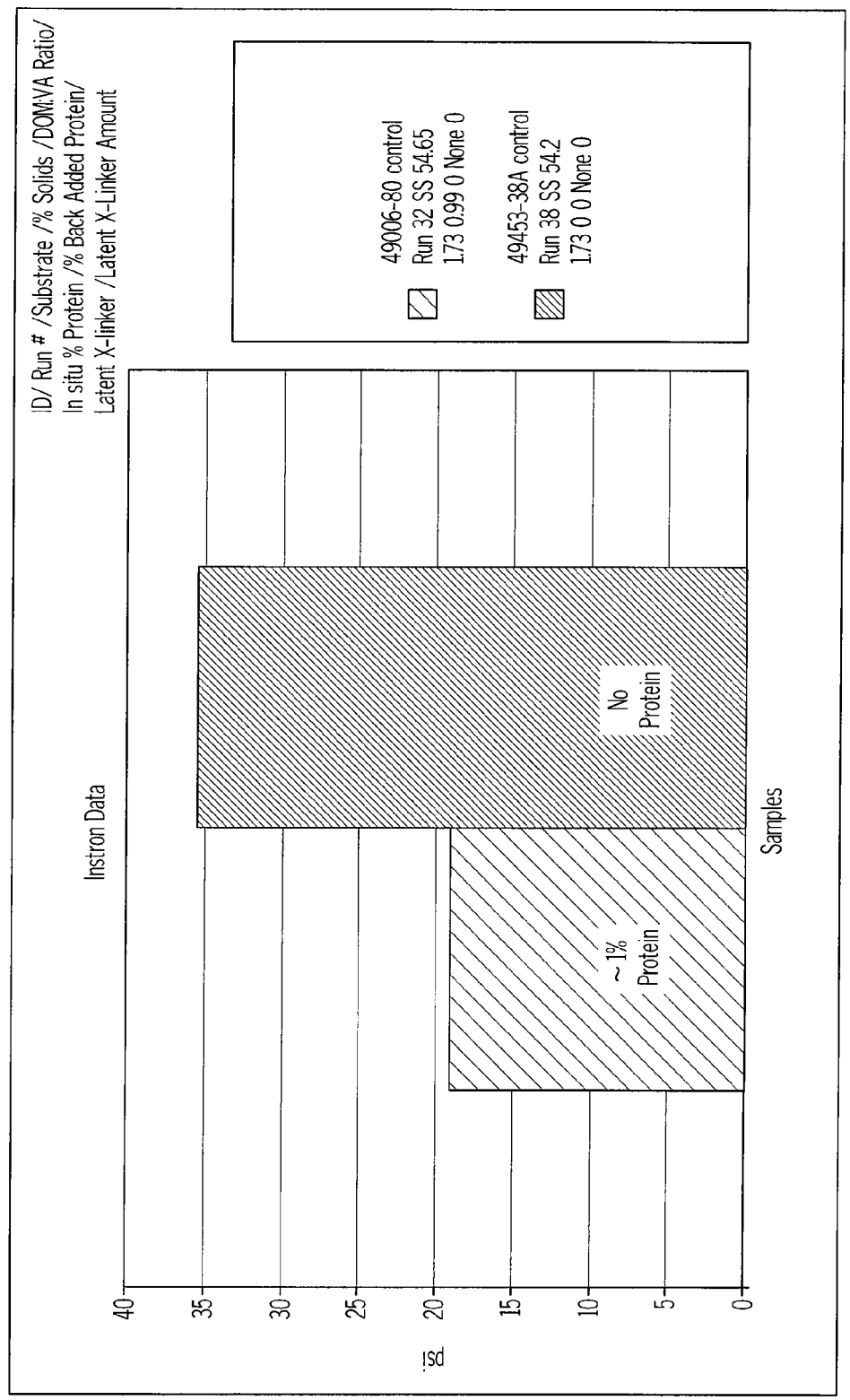
FIG. 7 is a graph illustrating the bond strength of latex formulations prepared with and without protein on stainless steel.
Figure 8:
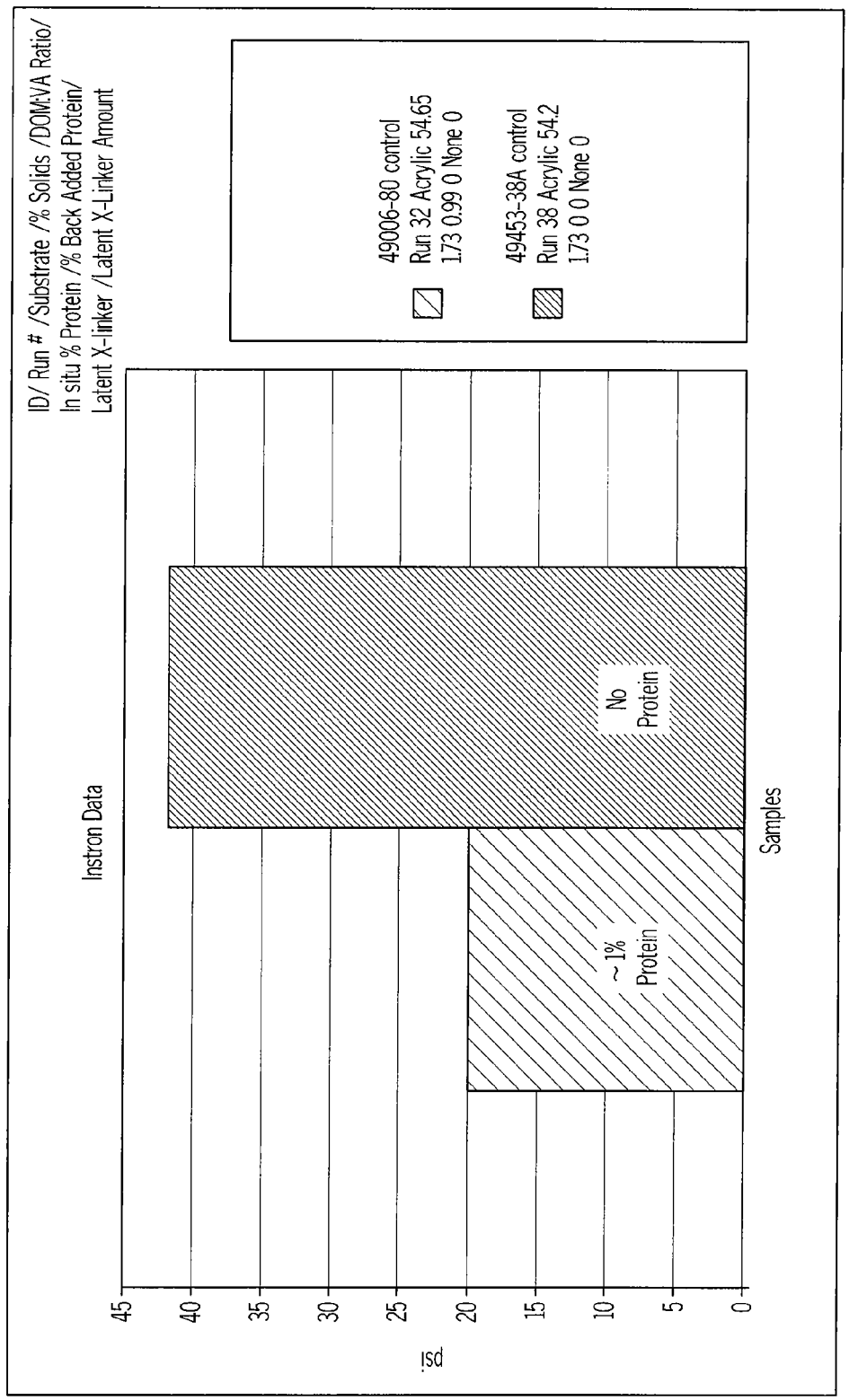
FIG. 8 is a graph illustrating the bond strength of latex formulations prepared with and without protein on acrylic.
Figure 13:
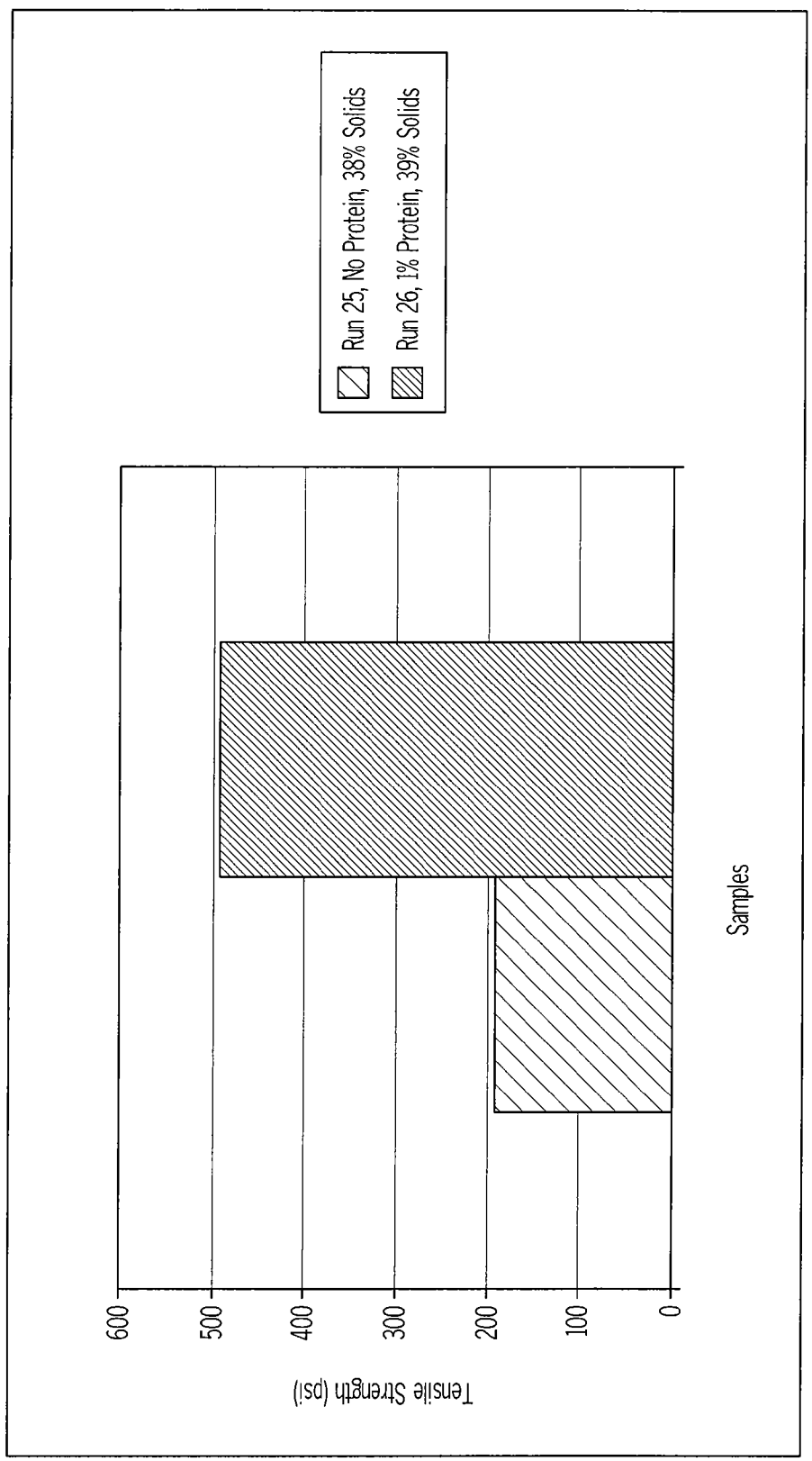
FIG. 13 is a graph illustrating comparative tensile strength of latex emulsions prepared with and without protein.

The results of Instron® testing confirmed that the addition of protein to the latex emulsions, containing a small amount of cross-linker, during polymerization deleteriously affected the tack and decreased the bond strength of both SS and acylic lap shear coupons (FIGS. 7 and 8). In contrast, as shown in FIG. 13, the tensile strength of Run 26 (vinyl acetate homopolymer prepared with out cross-linker and with 1% protein added in-situ during polymerization) exhibited better tensile strength than Run 25 a protein-free control formulation prepared without cross-linker. These coupons were tested on acrylic substrates.

Latent Addition of Protein to Latex Emulsions

Figure 9:
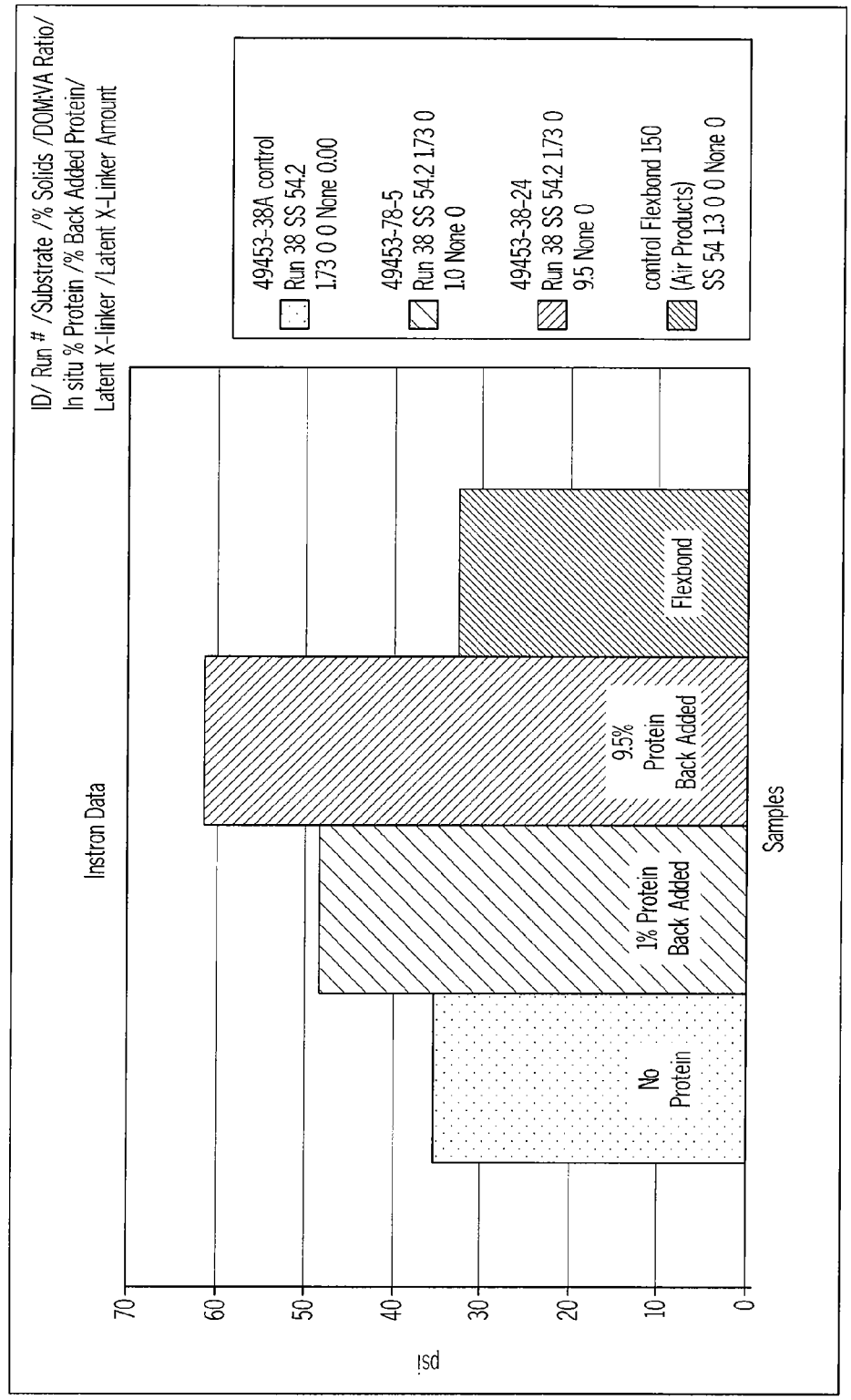
FIG. 9 is a graph illustrating the effect of back addition of protein to latex emulsions on stainless steel.
Figure 10:
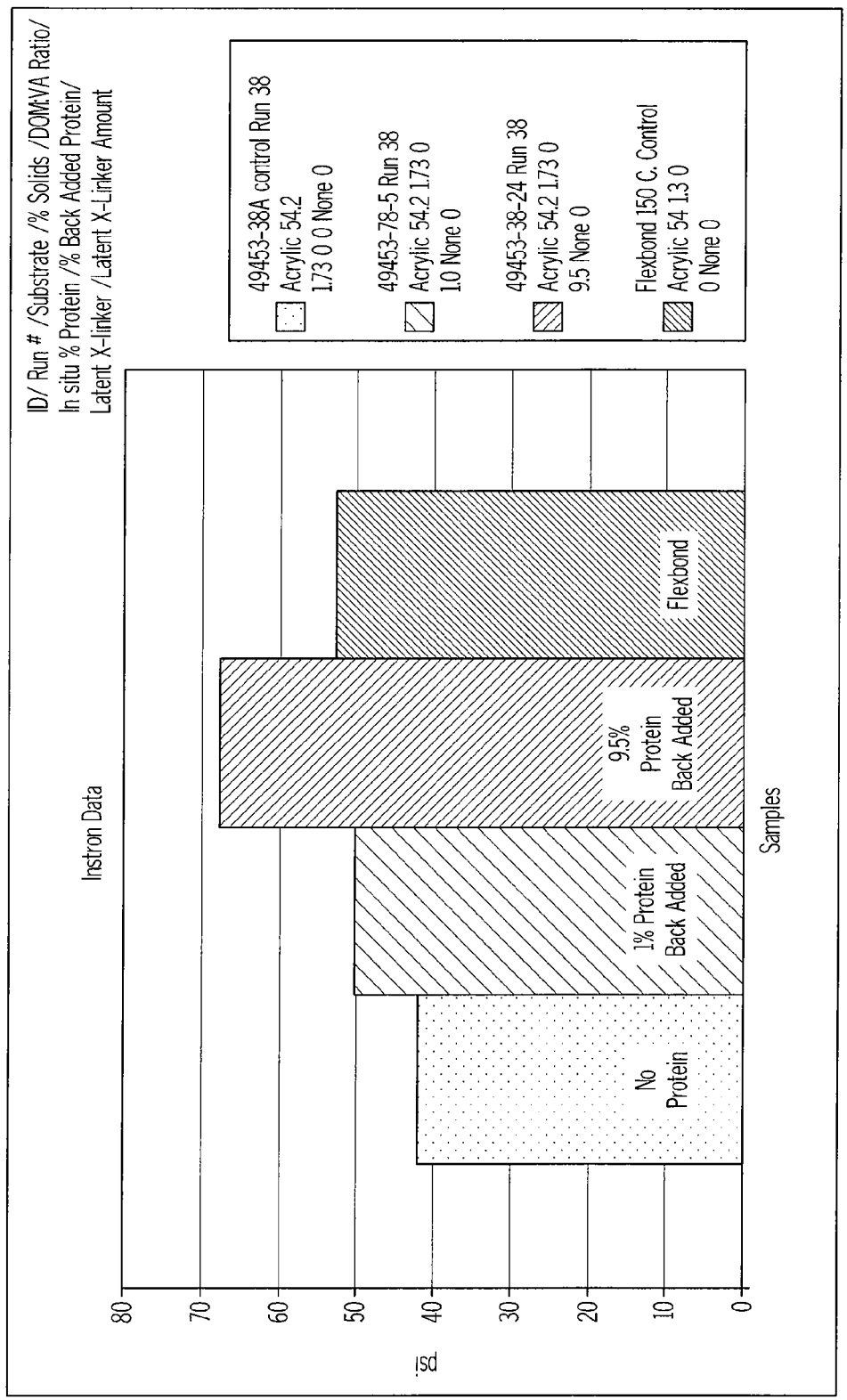
FIG. 10 is a graph illustrating the effective of back addition of protein to latex emulsions on acrylic.
Figure 11:
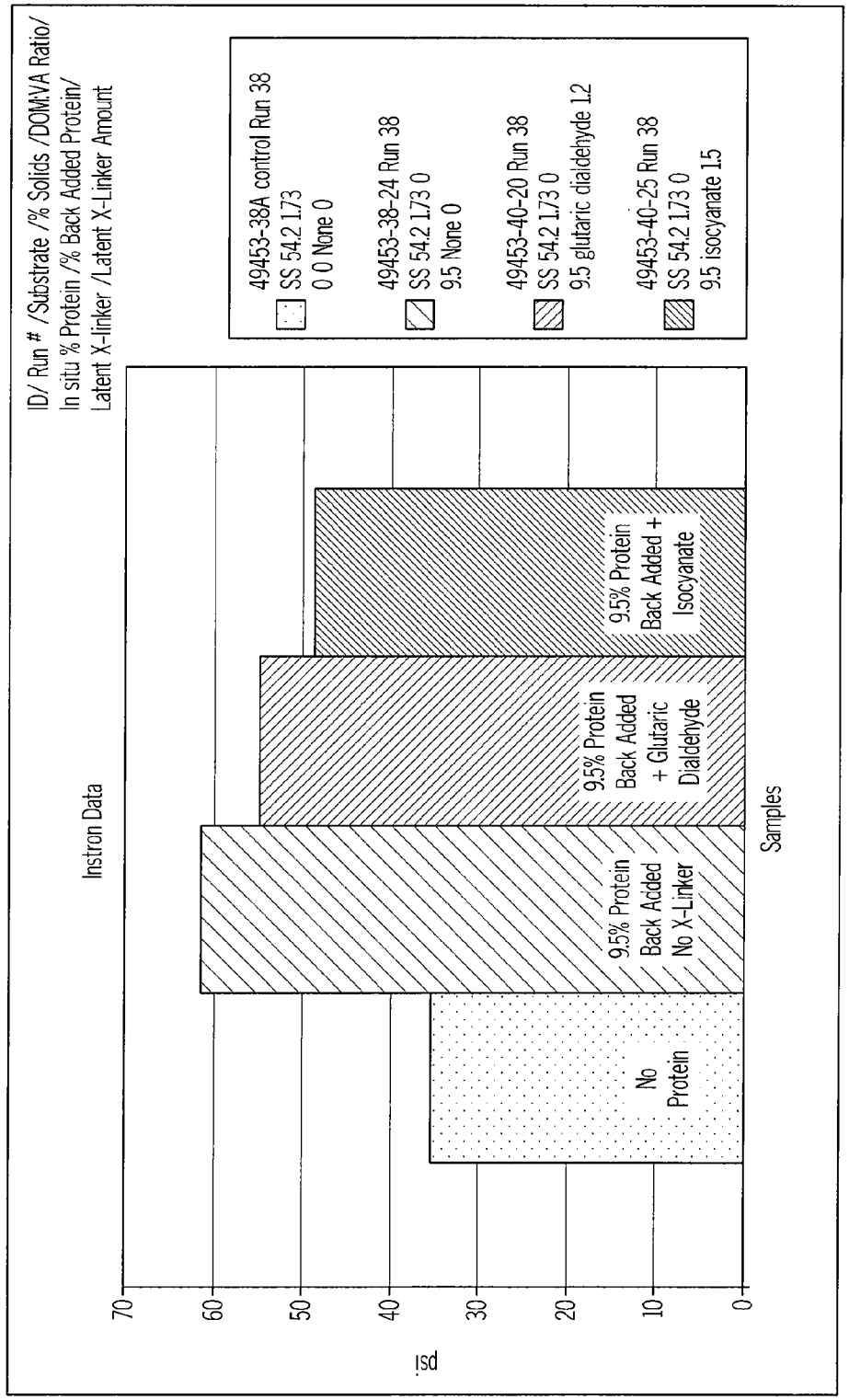
FIG. 11 is a graph illustrating the adhesive strength of chemically crosslinked latex emulsions including protein on stainless steel.
Figure 12:
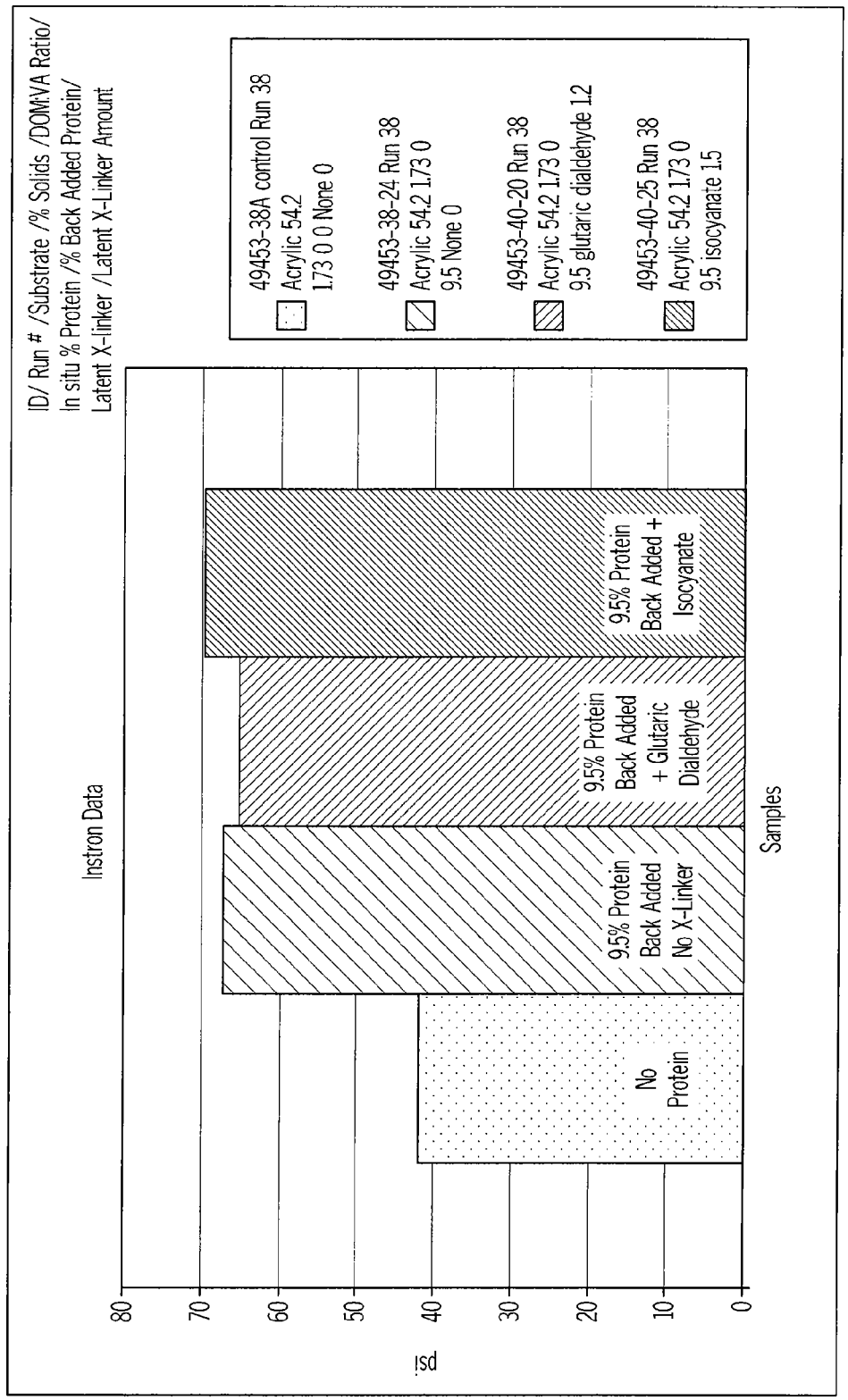
FIG. 12 is a graph illustrating the adhesive strength of chemically crosslinked latex emulsions including protein on acrylic.

The data clearly show that the simple back addition of protein to vinyl acetate latex emulsion after polymerization dramatically improved the bond strength of test specimens when compared to a protein-free formulation. Based on tensile strength results, the data further show that the adhesive strength and cohesive strength of vinyl acetate latex emulsions prepared with soy protein added after polymerization were superior to that of commercial control, Flexbond 150 sold by Air Products. This is shown in FIGS. 9 and 10 at protein concentrations of 9.5 and 1 weight percent. The subsequent addition of latent crosslinkers to the formulations containing 9.5 weight percent protein failed to appreciably enhance the adhesive strength of these formulations. These results are shown graphically in FIGS. 11 and 12.

A few additional formulations were prepared with vinyl acetate monomer that had no added DOM. The relative tensile strength of these emulsions prepared with and without in situ protein, was determined by Instron testing as well. The data clearly showed that the soy protein stabilized emulsions have superior tensile strength.

EXAMPLE 2

Emulsion Tests

Emulsification tests with vinyl acetate, acrylic and styrene monomers showed that soy protein isolates have fairly good emulsification properties, especially with mixed monomers. Emulsification properties of soy protein were compared with control protective colloids such as polyvinyl alcohol (PVOH) and hydroxy ethyl cellulose (HEC).

Emulsification studies of vinyl acetate, butyl acrylate, dioctyl maleate and styrene monomers using several grades of soy protein stabilizers from Protein Technologies International (PTI) were completed. Stable monomer emulsions at 40% solids were prepared with protein stabilizers and their overall stability were comparable to control monomer emulsions prepared with polyvinyl alcohol and hydroxy ethyl cellulose stabilizers.

Redox polymerization was carried out in coke bottle vessels for screening effects of protein type and level on emulsion polymerization using a recipe shown in Method 1. Pro Cote PC 5000 and ProCote 950 obtained from PTI seemed to show the most promise. The polymerization reaction proceeded well and stable emulsions were obtained with vinyl acetate based recipes. However, conversion was found to be only about 50%. It appears that at higher conversion, latex emulsions tend to be less stable.

The issue of emulsion stability was overcome by using a thermal initiator system and adding the protein during the last hour of the polymerization process. Using this delay addition approach, a stable 40% solids latex composed of vinyl acetate and dioctyl maleate was obtained.

The protein-stabilized latex was reactive with standard crosslinkers such as aldehydes and isocyanates.

EXAMPLE 3

This example illustrates the preparation of stable emulsions at a solids level above 45%. Stable emulsions were prepared (both vinyl acetate homopolymer and vinyl acetate-dioctyl maleate copolymer) by using the following procedure. The procedure consisted of using an anionic surfactant based on soybean oil (sulfated soybean oil with an hydrophilic-lipophilic balance (HLB) of <12) instead of an Igepal (ethoxylated nonyl phenol) of similar HLB and adding soy protein during the last one to two hours of the reaction. A stable homopolymer latex having a solid content of over 47% and copolymer latex at a solid of over 55% was prepared. These experiments were repeated 3-4 times to show reproducibility of the polymerization procedure.

EXAMPLE 4

In this example, the emulsion polymerization formulation was modified to increase the level of protein incorporation to 2% from the previous level of 1%. Several batches of emulsions were made that were stable and reproducible.

Two large batches of emulsions were prepared and evaluated: one based on soy protein stabilized polyvinyl acetate homopolymer and the other based on protein-stabilized vinyl acetate-dioctyl maleate copolymers.

Oven cured (about 90° C.) latex films formed from soy protein stabilized latexes showed that tensile strength of the film is higher compared to control latexes. This suggests that soy protein stabilized latexes behave like self-crosslinking emulsions.

Glass transition temperatures of protein stabilized homopolymers were about 6-8° C. higher than that of control homopolymers, suggesting that incorporation of protein improves rigidity and modulus of the polymer.

External crosslinkers such as polymeric isocyanate and epoxy show that there is evidence for interaction between external crosslinkers and the functional groups of protein stabilized homopolymer as measured by increased tensile strength and reduced elongation of test specimens.

FIG. 13 shows comparative tensile values of soy latex emulsions prepared with and without protein. The sample with protein had a tensile strength of almost 500 psi while the sample without protein only had a tensile strength of about 200 psi.

Soy-based products were evaluated for engineered wood applications and included a vinyl acetate homopolymer (Sample 49006-74) and a VA/DOM/TAC terpolymer with protein. The terpolymer failed to bond wood coupons together and delaminated after removal from the press. The homopolymer exhibited insufficient tack for wet tack applications, but showed acceptable properties for dry applications such as coatings. It appears that soy protein-stabilized homopolymer could be used in dry wood bonding Type-II adhesives.

The experimental results demonstrated that it is possible to prepare stable latex emulsions composed of vinyl acetate, dioctyl maleate, and monomers in the presence of soy protein. The addition of protein to the latex emulsions during polymerization deleteriously affected the tack and decreased the bond strength of lap shear coupons. In essence, the resulting adhesives have higher tack than commercial controls, but reduced cohesive strength in comparison to commercial products such as Flexbond.

Wood Bonding Application

Sample 49006-76, a vinyl acetate homopolymer with protein, was tested for possible use in engineered wood applications. The performance of the vinyl acetate homopolymer containing 1% soy protein was compared to Isoset 1000, a commercially available (Ashland Chemical) water-based adhesive used as a two-component acrylic emulsion polymer that is crosslinked with isocyanate. Parts bonded with Isoset adhesive are reported to be extremely durable with outstanding resistance to moisture and humidity. The vinyl acetate homopolymer was tested with and without the addition of CX-47, an MDI (methylene diisocyanate) crosslinker.

Procedure:
1. Douglas Fir was bonded with Isoset 1000 (control) and vinyl acetate homopolymer formulations, with and without soy protein and cured at room temperature for 7 days.
2. After preparation of coupons, samples were exposed to the following conditions: Dry testing, vacuum-pressure, and 3-cycle water soak according to ASTM 5751 "Standard Specifications for Adhesives Used in Nonstructural Glued Lumber Products"
3. The adhesive strength of the samples was evaluated by ASTM D905 entitled "Strength Properties of Adhesives Bonds in Shear by Compression Loading".

Adhesion testing was performed on 3"×1"×⅛" acrylic pieces. Coupons were scuff-sanded and doped with about 5 mil of the emulsion formulations on a 1-inch square area. Pieces were mated and cured at 60° C. and 100 PSI for 16 hours. Results are shown in Tables 8 and 9 below.

TABLE 8

Shear Strength of Test Specimens

| Sample | Dry | Vacuum-Pressure | 3-Cycle Soak | Comments |
|---|---|---|---|---|
| Isoset 1000 | 1285 psi | 140 psi | 930 psi | |
| Sample 49006-76, Vinyl acetate (~50% Solids) (no crosslinker) | 1175 psi | 32 psi | 982 psi | Improvement in hydrolytic stability noted with out addition of external cross-linker. |
| Sample 49006-76, Vinyl acetate + 5% CX-47 (as crosslinker) | 994 psi | 63 psi | 851 psi | |

TABLE 9

Percent Wood Failure for Test Specimens

| Sample | Dry | Vacuum-Pressure | 3-Cycle Soak | Comments |
|---|---|---|---|---|
| Isoset 1000 | 94% | 18% | 84% | |
| Vinyl acetate homopolymer (~50% Solids) (no crosslinker) | 91% | 0% | 89% | Improvement in hydrolytic stability without addition of external crosslinker |
| Sample 49006-76, Homopolymer + 5% CX-47 (As crosslinker) | 92% | 0% | 91% | |

(Note: The higher the percent wood loss the better the adhesion)

The results showed that protein stabilized vinyl acetate latex had a performance comparable to more expensive acrylic-based two-part emulsion systems. The water resistance of the adhesive was slightly better than the acrylic control latex. The experimental vinyl acetate latex also showed self-crosslinking features. It is expected that similar performance enhancement would be seen in a latex system for coating applications.

Wet Laminating Adhesive Application

The cloth to cloth cohesion of sample 49006-43 (Battelle vinyl acetate homopolymer with 1% protein added during polymerization) was compared to that of a commercially available (Air Products) polyvinyl alcohol/acetate emulsion product, Vinac®-210. Cohesive strength of laminates (wet and dry) was determined by T-peel at 2 inches/minute before and after heating samples at 70 C for one hour. Wet laminates were tested after one hour water soak at room temperature. Results and formulation specifics are listed below in Tables 10 and 11.

TABLE 10

| Emulsion Properties | (Vinyl acetate polymer + 1% protein) Sample # 49006-3 | Vinac-210 (PVOH/PVAc Co-polymer) |
|---|---|---|
| Percent Solids | 49.7 | 55.3 |
| Viscosity (cP) | 655 | 1215 |
| pH | 4.41 | 5.26 |
| Density (g/ml) | 9.06 | — |

TABLE 11

Water Resistance Evaluation of Adhesive Bond (Cloth on Cloth)

| Cloth to Cloth Cohesion (1 inch peel at 2 inches/minute) | 49006-43 VA Emulsion + 1% Protein (No heat) | XX210 (No heat) | 49006-43 VA Emulsion + 1% Protein (▲ 70° C.) | XX210 (▲ 70° C.) | COMMENTS |
|---|---|---|---|---|---|
| WET (pounds/inch) Immediately after soaking for 60 minutes in RT water | 0.1 | 0.0 | 3.7 | 0.0 | Dramatic improvement in wet cloth to cloth adhesion after heating Sample 49006-43 observed. The peel strength measured (3.7 lbs/in) is a very high value. |
| DRY (pounds/inch) | 1.9 | 4.6 | 6.8 | 4.9 | Significant improvement (3.6 times) in dry cloth to cloth adhesion noted after heating Sample 49006-43. |

The results showed that the wet strength of the cloth laminate made with protein stabilized homopolymer was significantly better than the control homopolymer. It is expected that similar performance enhancement would be seen in a latex system for coating applications. A wet cloth-to cloth peel strength of 3.7 lb/inch is most dramatic and very high.

Results for the evaluation of Samples 49006-32 and 49006-43 are shown in Table 7. Overall, the 49006-32 VOAc/DOM emulsion was a soft polymer that showed adhesion and tack to low density polyethylene (LDPE.). The cohesive strength of 49006-32 was very low. 49006-43 VOAc homopolymer emulsion had a relatively broad particle size and thus did not thicken very well upon addition of plasticizer. The adhesion of 49006-43 was lower than that of a conventional PVOH-protected VOAc emulsion but increased significantly when the bond was exposed to 70° C. for 1 hour. The water resistance of the bond was also improved dramatically upon exposure to 70° C. The setting speed (time to paper fiber tear) of 49006-43 was relatively slow.

49006-32 VOAC/DOM Soy-Protected Emulsion

The performance of Sample 49006-32 was tested against the performance of two VOAC/DOM products commercially available from Air Products Polymers (APP): Flexbond® 149 and Flexbond® 150. The emulsions were coated directly to 2 mil Mylar® to avoid the need for formulation with wetting agents. Pressure sensitive adhesive (PSA) test methods were used:

180° Peel adhesion from stainless steel (SS), low density polyethylene (LDPE) and corrugated cardboard (CC) after 30 minutes dwell
Loop Tack from SS, LDPE, CC
Static Shear-1"×1"×1 kg
The results are shown in Table 12 below.

TABLE 12

Performance of Sample 49006-32.

| 2 mil Mylar, Direct | | | FB149 | FB150 | 49006-32 |
|---|---|---|---|---|---|
| Coat Weight, g/m2 | | | 19.1 | 18.9 | 19.3 |
| 180° Peel | SS | Average | 2.74 | 2.32 | 2.24 T |
| 30' Dwell | | Std Dev | 0.19 | 0.05 | 0.06 |
| 180° Peel | LDPE | Average | 0.15 | 0.12 | 2.55 T |
| 30' Dwell | | Std Dev | 0.02 | 0.02 | 0.14 |
| 180° Peel | CC | Average | 1.88 | 1.00 | 1.02 |
| 30' Dwell | | Std Dev | 0.05 | 0.05 | 0.14 |
| Loop Tack | SS | Average | 3.66 T | 2.51 | 6.23 T |
| | | Std Dev | 0.09 | 0.12 | 0.06 |
| Loop Tack | LDPE | Average | 0.92 | 0.25 | 2.46 |
| | | Std Dev | 0.11 | 0.05 | 0.11 |

TABLE 12-continued

Performance of Sample 49006-32.

| 2 mil Mylar, Direct | | | FB149 | FB150 | 49006-32 |
|---|---|---|---|---|---|
| Loop Tack | CC | Average | 1.80 | 0.30 | 1.36 |
| | | Std Dev | 0.05 | 0.05 | 0.17 |
| Shear 1" × 1" × 1 kg - 30' Dwell | SS | Average | 4.99 | 12.46 | 0.37 |
| | | Std Dev | 0.14 | 0.33 | 0.03 |

T = Transfer of adhesive from Mylar to substrate

Sample 49006-32 was a very soft polymer. The 0.37 hours Static Shear time (to failure) was very low. Flexbond 149 is already considered a soft polymer at 5 hours. This softness may contribute to the good adhesion of 49006-32 to stainless steel and LDPE. The 49006-32 transferred from the Mylar to the LDPE panel during the test, further showing the higher adhesion to LDPE. The adhesion and tack of 49006-32 to CC was typical.

49006-43 VOAC Soy-Protected Emulsion

The performance of sample 49006-43 was evaluated against the performance of one of APP's PVOH-protected emulsions. Vinac® XX-210 was chosen, which was the lowest viscosity grade but still exhibited a higher viscosity than the viscosity of 49006-43. The particle size distribution of XX-210 was relatively broad and, as a result, the emulsion did not thicken very much upon addition of 10 parts plasticizer (Benzoflex® 50 commercially available from Velsicol Chemical Corp.) The 49006-43 sample responded even less to plasticizer addition. This thickening may allow formulators to extend the emulsion with a relatively low amount of (more expensive) plasticizer. Standard APP packaging test methods were used to evaluate performance:

Cloth to Cloth cohesion ("T" peel at 2 inches/minute)
Dry
Wet—immediately after the cloth laminate has been soaked for 60 minutes in room temperature Water
Creep Resistance—the rate of delamination (hanging "T" peel, 500 grams) of a 1 inch cloth-to-cloth strip at 77° C. Heat resistance.
Speed of Set—the time after forming a paper/paper lamination (at room temperature) that is required to generate 50% fiber tear
Thin Film on Glass—qualitative assessment of film properties.

The results are shown in Table 13 below.

TABLE 13

Performance of 49006-43

|  | 49006-43 | 49006-43 @ 70° C. | XX210 | XX210 @ 70° C. |
|---|---|---|---|---|
| Solids | 49.7 |  | 55.3 |  |
| Viscosity | 655 |  | 1215 |  |
| pH | 4.41 |  | 5.26 |  |
| Density | 9.06 |  |  |  |
| Plasticizer Response |  |  |  |  |
| Visc., 20 rpm | 770 |  | 1930 |  |
| Ratio | 1.18 |  | 1.59 |  |
| Cloth To Cloth |  |  |  |  |
| Creep (mm/min.) | >0.849 | >0.819 | 0.014 | 0.009 |
| Wet (lb/in) | 0.1 | 3.7 | 0.0 | 0.0 |
| Dry (lb/in) | 1.9 | 6.8 | 4.6 | 4.9 |
| Speed of Set (sec.) |  |  |  |  |
| TAPPI | 12-15 |  | 3-6 |  |
| New Method | 25-30 |  | 20-24 |  |

TABLE 13-continued

Performance of 49006-43

|  | 49006-43 | 49006-43 @ 70° C. | XX210 | XX210 @ 70° C. |
|---|---|---|---|---|
| Thin Film on Glass |  |  |  |  |
| Clarity | Hazy |  | Hazy |  |
| Tack | No Tack |  | No Tack |  |
| Adhesion | Poor |  | Fair |  |
| Flexibility | Brittle |  | Brittle |  |
| Water Resistance | Blushed, Re-emulsified, Broke Thru |  | Blushed, Re-emulsified, Broke Thru |  |

As was the case for Sample 49006-32, the cohesive strength of Sample 49006-43 was relatively low. This was illustrated by the low creep resistance and dry cloth-to-cloth performance. When exposed the bond to 70° C. for one hour, a significant improvement in dry cloth-to-cloth cohesion was obtained but no improvement in heat resistance was found. The water resistance of the bond was very good. 3.7 lb/inch was a very high wet cloth-to-cloth peel strength. The setting speed of 49006-43 was slow.

Both 49006 products showed signs of settling after several weeks. The top water layer was readily distributed with mild agitation.

Relative to enhancing the cohesive strength of protein-based emulsions, the back addition of protein affords a significant improvement in lap shear performance. The benefit of subsequently crosslinking such formulations with glutaric dialdehyde or isocyanate was inconclusive. Under low, static load conditions (Creep Tests) enhanced adhesive performance was observed. The breaking loads of chemically crosslinked samples that were Instron tested were approximately equivalent to those of the controls containing protein but no crosslinking agents. The enhanced adhesive performance observed by the latent addition of protein to experimental emulsions is unusual and unexpected.

Additional latex/protein formulations are shown in Table 14 below.

TABLE 14

Summary of Additional Latex/Protein Formulations

| Commercial Product Trade Name | Product Description | Mass of Commercial Product (Grams) | Back-added Protein (Grams) | % Protein (w/w) | Comments |
|---|---|---|---|---|---|
| Flexbond 150 | VOC/DOM emulsion (55% solids Viscosity 350-850 cPs), High peel and aggressive dry tack. Adheres to wide variety of treated and untreated surfaces. Colloidally stabilized for good wet tack. | 665 | 35 | 5 | Sample 49453-93-5 |
| Vinac XX-210 | General-purpose, polyvinyl alcohol protected vinyl acetate emulsion (55% solids, Viscosity = 100-1400 cPs. Used for packaging applications and wood glues. Excellent machinability, solvent tolerance and freeze-thaw stability. | 665 | 35 | 5 | Sample 49453-93-18 |
| Vinac XX-230 | General-purpose, polyvinyl alcohol protected vinyl acetate emulsion (55% Solids, Viscosity = 2000-2600 cPs). Used for packaging applications and wood glues. Excellent machinability, solvent tolerance and freeze-thaw stability. | 665 | 35 | 5 | Sample 49453-94-15 |

TABLE 14-continued

Summary of Additional Latex/Protein Formulations

| Commercial Product Trade Name | Product Description | Mass of Commercial Product (Grams) | Back-added Protein (Grams) | % Protein (w/w) | Comments |
|---|---|---|---|---|---|
| 49006-32 | Vinyl acetate/DOM emulsion (59% T. solids, 0.89% protein) | | | | Protein added during polymerization. |
| 49006-43 | Vinyl acetate homopolymer, (50% solids, ~1% protein) | | 1% Protein added during polymerization | | Protein added during polymerization. PREPARED WITH INCREASED SOLIDS TO 55% |
| 49006-74 | VA/DOM/TAC Terpolymer (59% T. solids, 0.89% protein) | | | | Protein added during polymerization. |
| 49006-76 | Vinyl acetate homopolymer (T. Solids 50%, 1.1% protein) | | | | Protein added during polymerization. |

EXAMPLE 5

A solution for the polymerization of a vinyl acetate homopolymer was prepared using the procedure described in Method 1.

Preparation of Reducer Solution, Run 2 (SFS-Solution 1)

In brief, high purity water (38.18 g), sodium formaldehyde sulfoxide (2.66 g) and sodium acetate (0.410 g) were added to a bottle and lightly hand mixed to obtain complete dissolution, for about 5 minutes. Subsequently, the solution was added to a reaction mixture by drop-wise addition with a funnel over a period of about 2 hours.

Preparation of Monomer Solution, Run 2 (Solution 2)

Vinyl acetate was added directly to the reaction flask as detailed in the general polymerization procedure below.

Preparation of Stabilizer/Surfactant/Protein Mixture, Run 2 (Solution 3)

A stir bar was added to a suitable size container, and 290 g of supernatant from the previously prepared Supro 710 protein mixture was added to the container (where the protein mixture contained about 3 wt % protein, 281.3 g water, and 8.7 g protein). While stirring, Cellosize QP 300 (hydroxyethylcellulose available from Dow Chemical Co.) (0.95 g) and Natrosol 250 LR (hydroxyethylcellulose available from Hercules/Aqualon) (3.10 g) were added at room temperature. The solution was heated to 60° C. while stirring and holding for about 10 minutes.

The solution was then cooled to room temperature and water lost through evaporation was added. Surfactants Igepal CO887 (Rhone Poulenc) (5.41 g) and Actrasol MY 75 (Polartech Additives, Inc.) (10.66 g) were then added and mixed gently to avoid foaming and incorporation of air. The mixture was capped and held for addition to the reaction flask. When this solution was added to the reaction flask, makeup water (used to adjust solids to 50%) was used to rinse the container. For Run 2, this was 77.09 g as shown in Table 16.

Preparation of Initiator Mixture (Solution 4)

t-butyl peroxide (neat) was added directly to the reaction flask. Ferrous sulfate was added as a 1 wt % aqueous solution.

Preparation of Protein Solution (Solution 5)

475 g deionized water was added to a suitable sized tared container. 25 g Supro 710 was added slowing while mixing with an overhead stirrer. Once all the protein was added, the mixture was heated to 66° C. and held for 30 minutes. The mixture was cooled to room temperature and makeup water was added to compensate for any loss through evaporation. Once cooled, the mixture was centrifuged for 30 minutes at 3500 rpms. The supernatant was then removed for use in polymerization.

General Polymerization Procedure for Preparation of Vinyl Acetate Homopolymer With Protein A 2-liter flask was fitted with an overhead stirrer, heating mantle, dropping funnel and condenser. The flask was purged with argon. The surfactant-protein mixture was added to the flask and heated to 60° C. At 55 to 60° C., argon purged vinyl acetate was added slowly over about 40 minutes with moderate stirring. The mixture was then stirred at a high rate for 5-10 minutes, then reduced to moderate speed. Ferrous sulfate was then added, followed by the first aliquot of t-butyl peroxide.

Drop-wise addition of the SFS solution was then initiated, about 1 drop/5 seconds. The temperature slowly rose to 65-70° C. Following the addition of the SFS solution (about 2 hours), the second aliquot of t-butyl peroxide was added. The temperature was then increased to 80° C. and held for 3 hours. The reaction was then cooled to room temperature and 10 g of a 1% sodium bicarbonate solution was added. The reaction product was bottled and weighed. 1 g of Troysan 174 (available from Troy Corporation) was added as a preservative and bactericide. The formulation as shown below in Table 15, produced a highly stable emulsion with good tack.

TABLE 7

Experimental Summary of Runs

| Run Number | Percent Soy Protein | Protein Type | Initiator | Theoretical % Solids | % DOM | % VA | Ratio DOM/VA | % Cross-linker | Comments |
|---|---|---|---|---|---|---|---|---|---|
| Run 2 | 0 | None | t-BHP | 55.5 | 37.4 | 16.2 | 2.31 | 0.05 | control |
| Run 3 | 0 | None | t-BHP | 55.6 | 37.3 | 16.2 | 2.31 | 0.06 | very thick |
| Run 4 | 0.37 | PC 4200 | t-BHP | 51.5 | 34.7 | 15 | 2.31 | 0.05 | gelled |
| Run 5 | 0.34 | PC 5000 | t-BHP | 50.37 | 33.7 | 14.6 | 2.31 | 0.05 | dough-like consistency |

TABLE 7-continued

Experimental Summary of Runs

| Run Number | Percent Soy Protein | Protein Type | Initiator | Theoretical % Solids | % DOM | % VA | Ratio DOM/VA | % Cross-linker | Comments |
|---|---|---|---|---|---|---|---|---|---|
| Run 6 | 5.3 | PC 4200 | Vazo 64* | 34.9 | 20.3 | 8.7 | 2.34 | 0.05 | gelled |
| Run 7 | 0.4 | PC 4200 | Vazo 64 | 31.7 | 1.52 | 24 | 0.06 | 4.55 (BA) | gelled |
| Run 9 | 0.63 | PC 4200 | Vazo 64 | 32.63 | 1.61 | 23.84 | 0.07 | 4.52 (BA) | gelled |
| Run 10 | 0.46 | PC 4200 | Vazo 64 | 33.16 | 1.56 | 23.43 | 0.07 | 4.44 (BA) | stable emulsion |
| Run 11 | 0.91 | PC 4200 | Vazo 64 | 33.5 | 1.61 | 23.41 | 0.07 | 4.42 (BA) | |
| Run 12 | 0.46 | PC 5000 | Vazo 64 | 33.29 | 1.62 | 23.47 | 0.07 | 4.52 (BA) | gelled |
| Run 13 | 1.01 | FP 950 | t-BHP | 54.36 | 35.73 | 15.47 | 2.31 | 0.05 | partially gelled |
| Run 14 | 0.12 | FP 950 | t-BHP | 53.58 | 35.98 | 15.58 | 2.31 | 0.05 | |
| Run 15 | 0.17 | FP 950 | Potassium Persulfate | 33.29 | 22.22 | 9.62 | 2.31 | 0 | |
| Run 16 | 0.17 | FP 950 | Potassium Persulfate | 33.38 | 22.15 | 9.59 | 2.31 | 0 | Water-like viscosity |
| Run 17 | 0.24 | FP 950 | Potassium Persulfate | 48.3 | | 27.75 | | | phase separation |
| Run 18 | 0.19 | FP 950 | Potassium Persulfate | 37.08 | 24.57 | 10.64 | 2.31 | 0 | partially gelled |
| Run 19 | 0.26 | FP 950 | t-BHP | 51.17 | 33.93 | 14.69 | 2.31 | 0.05 | |
| Run 20 | 0.75 | FP 950 | t-BHP | 49.76 | 32.63 | 14.13 | 2.31 | 0.09 | |
| Run 21 | 0 | None | t-BHP | 56.62 | 37.68 | 16.33 | 2.31 | 0.05 | |
| Run 22 | 1.11 | FP 950 | t-BHP | 58.84 | 39.18 | 16.96 | 2.31 | 0.05 | gelled |
| Run 23 | 0.89 | FP 950 | t-BHP | 58.19 | 38.94 | 16.86 | 2.31 | 0.05 | ok |
| Run 24 | 0.89 | FP 950 | t-BHP | 58.2 | 38.9 | 16.88 | 2.31 | 0.05 | ok |
| Run 25 | 0 | None | t-BHP | 38.4 | 0 | 34.9 | NA | 0 | ok |
| Run 26 | 1.32 | FP 950 | t-BHP | 39.25 | 0 | 34.49 | NA | 0 | ok |
| Run 27 | 1.08 | FP 950 | t-BHP | 50.37 | 0 | 46.49 | NA | 0 | ok |
| Run 28 | 0 | None | t-BHP | 38.2 | 0 | 34.9 | NA | 0 | ok |
| Run 29 | 1.3 | FP 950 | t-BHP | 39.26 | 0 | 34.5 | NA | 0 | ok |
| Run 30 | 0.89 | FP 950 | t-BHP | 58.17 | 38.95 | 16.86 | 2.31 | 0.05 | gelled |
| Run 31 | 1.08 | FP 950 | t-BHP | 50.38 | 0 | 46.5 | NA | 0 | ok |
| Run 32 | 0.99 | FP 950 | t-BHP | 54.65 | 32.36 | 18.67 | 1.73 | 0.06 | ok |
| Run 33 | 0.85 | FP 950 | t-BHP | 60.73 | 37.36 | 20.21 | 1.85 | 0.06 | ok |
| Run 34 | 0 | None | t-BHP | 58.4 | 39.3 | 17 | 2.31 | 0.05 | ok |
| Run 35 | 0.76 | FP 950 | t-BHP | 65.04 | 39.4 | 22.84 | 1.72 | 0.06 | gelled |
| Run 36 | 0 | None | t-BHP | 64.8 | 39.7 | 23 | 1.72 | 0.06 | mayo-like emulsion |
| Run 37 | 0.91 | FP 950 | t-BHP | 60.3 | 35.8 | 20.8 | 1.7 | 0.06 | gelled |
| Run 38 | 0 | None | t-BHP | 54.2 | 32.7 | 18.9 | 1.73 | 0.06 | ok |
| Run 39 | 0.99 | FP 950 | t-BHP | 54.7 | 32.36 | 18.68 | 1.73 | 0.06 | ok |
| Run 40 | 0 | None | t-BHP | 54.2 | 32.68 | 18.86 | 1.73 | 0.06 | ok |
| Run 41 | 0.99 | FP 950 | t-BHP | 54.6 | 32.36 | 18.68 | 1.73 | 0.06 | gelled (2x's t-BHP) |
| Run 42 | 1.03 | FP 950 | t-BHP | 54.95 | 25.58 | 25.58 | 1 | 0.06 | ok |
| Run 43 | 1.03 | FP 950 | t-BHP | 54.98 | 17.23 | 33.98 | 0.51 | 0.06 | gelled |
| Run 44 | 0.8 | FP 950 | t-BHP | 64.85 | 38.78 | 22.38 | 1.73 | 0.06 | ok-increased stabilizers |
| Run 46 | 0 | None | t-BHP | 64.75 | 30.92 | 30.92 | 1 | 0.06 | paste/gelled |
| SCALE-UP RUNS | | | | | | | | | |
| Run 32C-49006-32 | 0.89 | FP 950 | t-BHP | 59.05 | 38.95 | 16.85 | 2.31 | 0.05 | |
| Run 34C-49006-34/49006-43 | 1.08 | FP 950 | t-BHP | 50.13 | 0 | 46.72 | NA | 0 | |
| Run 36C-49006-36/49006-43 | 1.08 | FP 950 | t-BHP | 50.24 | 0 | 46.5 | NA | 0 | |
| SCALE-UP RUNS | | | | | | | | | |
| Run 21C-49006-70 | 0 | None | t-BHP | 58.7 | 39.3 | 17 | 2.31 | 0.05 | |
| Run 25C-49006-72 | 0 | None | t-BHP | 38.4 | 0 | 34.96 | NA | 0 | |
| Run 23C-49006-74 | 0.89 | FP 950 | t-BHP | 59.01 | 38.86 | 16.89 | 2.3 | 0.05 | |
| Run 27C-49006-76 Flexbond 150 (Air Products) | 1.08 | FP 950 | t-BHP | 50.23 | 0 | 46.5 | NA | 0 | |

*Vazo 64 is an azonitride (2,2'-azobis (2-methylbutyronitrile) polymerization initiator available from DuPont.

TABLE 7A

Quantitative Composition of Run 25

| | Actual grams | Grams solid | Weight % |
|---|---|---|---|
| REDUCER SOLUTION (SFS DELAY) | | | |
| Sodium formaldehyde sulfoxide | 0.47 | 0.47 | 0.41 |
| Water | 6.70 | | 5.86 |
| Sodium acetate | 0.07 | 0.07 | 0.06 |
| Total = | 7.24 | 0.54 | |
| MONOMER DELAY MONOMER MIXTURE | | | |
| Vinyl acetate | 40.00 | 40.00 | 34.96 |
| Total = | 40.00 | 40.00 | |
| INITIAL CHARGE (SURFACTANT MIXTURE) | | | |
| Water | 63.00 | | 55.06 |
| Cellosize QP-300 | 0.17 | 0.17 | 0.15 |
| Natrosol 250LR | 0.54 | 0.54 | 0.48 |
| Igepal CO-887 | 0.95 | 0.95 | 0.83 |
| Actrosol MY75 (75%) | 1.88 | 1.41 | 1.64 |
| Total = | 66.54 | 3.07 | |
| Ferrous sulfate (1%) | 0.10 | 0.00 | 0.09 |
| tBHP (70%) | 0.39 | 0.27 | 0.34 |
| tBHP (70%) | 0.15 | 0.11 | 0.13 |
| Total = | 0.64 | 0.38 | |
| GRAND TOTAL = | 114.42 | 43.99 | 100.00 |
| Theoretical % Solids | 38.44 | | |

Comment: tBHP is tertiary butyl hydro peroxide

TABLE 7B

Quantitative Composition of Run (Run 26)

| | Actual grams | Grams solid | Weight % |
|---|---|---|---|
| REDUCER SOLUTION (SFS DELAY) | | | |
| Sodium formaldehyde sulfoxide | 0.47 | 0.47 | 0.40 |
| Water | 6.70 | | 5.78 |
| Sodium acetate | 0.07 | 0.07 | 0.06 |
| Total = | 7.24 | 0.54 | |
| MONOMER DELAY MONOMER MIXTURE | | | |
| Vinyl acetate | 40.00 | 40.00 | 34.49 |
| Total = | 40.00 | 40.00 | |
| INITIAL CHARGE (SURFACTANT/PROTEIN MIXTURE) | | | |
| 3% Aqueous Protein Solution | 51.03 | | |
| Water | 49.50 | | 42.69 |
| FP 950 | 1.53 | 1.53 | 1.32 |
| Water make-up | 13.52 | | 11.66 |
| Cellosize QP-300 | 0.17 | 0.17 | 0.14 |
| Natrosol 250LR | 0.54 | 0.54 | 0.47 |
| Igepal CO-887 | 0.95 | 0.95 | 0.82 |
| Actrosol MY75 (75%) | 1.87 | 1.40 | 1.61 |
| Total = | 68.08 | 4.59 | |
| Ferrous sulfate (1%) | 0.10 | 0.00 | 0.09 |

TABLE 7B-continued

Quantitative Composition of Run (Run 26)

| | Actual grams | Grams solid | Weight % |
|---|---|---|---|
| tBHP (70%) | 0.39 | 0.27 | 0.34 |
| tBHP (70%) | 0.15 | 0.11 | 0.13 |
| Total = | 0.64 | 0.38 | |
| GRAND TOTAL = | 115.96 | 45.51 | 100.00 |
| Theoretical % Solids | 39.25 | | |

TABLE 7C

Quantitative Composition of Run 32

| | Actual grams | Grams solid | Weight % |
|---|---|---|---|
| REDUCER SOLUTION (SFS DELAY) | | | |
| Sodium formaldehyde sulfoxide | 1.82 | 1.82 | 0.30 |
| Water | 26.12 | | 4.31 |
| Sodium acetate | 0.28 | 0.28 | 0.05 |
| Total = | 28.22 | 2.10 | |
| MONOMER DELAY MONOMER MIXTURE | | | |
| Vinyl acetate | 113.10 | 113.10 | 18.67 |
| Dioctyl maleate (DOM) | 196.00 | 196.00 | 32.36 |
| Triallylcyanurate | 0.35 | 0.35 | 0.06 |
| Total = | 309.45 | 309.45 | |
| INITIAL CHARGE (SURFACTANT/PROTEIN MIXTURE) | | | |
| 3% Aqueous Protein Solution | 198.89 | | |
| Water | 192.92 | | 31.85 |
| FP 950 | 5.97 | 5.97 | 0.99 |
| Water make-up | 52.79 | | 8.72 |
| Cellosize QP-300 | 0.65 | 0.65 | 0.11 |
| Natrosol 250LR | 2.12 | 2.12 | 0.35 |
| Igepal CO-887 | 3.77 | 3.77 | 0.62 |
| Actrosol MY75 (75%) | 7.31 | 5.48 | 1.21 |
| Total = | 265.53 | 17.99 | |
| Ferrous sulfate (1%) | 0.39 | 0.00 | 0.06 |
| tBHP (70%) | 1.52 | 1.06 | 0.25 |
| tBHP (70%) | 0.60 | 0.42 | 0.10 |
| Total = | 2.51 | 1.49 | |
| GRAND TOTAL = | 605.71 | 331.03 | 100.00 |
| DOM/VA Ratio | 1.73 | | |
| Theoretical % Solids | 54.65 | | |

TABLE 7D

Quantitative Composition of Run 34

| | Actual grams | Grams solid | Weight % |
|---|---|---|---|
| REDUCER SOLUTION (SFS DELAY) | | | |
| Sodium formaldehyde sulfoxide | 1.64 | 1.64 | 0.27 |
| Water | 23.58 | | 3.93 |
| Sodium acetate | 0.25 | 0.25 | 0.04 |
| Total = | 25.47 | | |

TABLE 7D-continued

Quantitative Composition of Run 34

|  | Actual grams | Grams solid | Weight % |
|---|---|---|---|
| MONOMER DELAY MONOMER MIXTURE | | | |
| Vinyl acetate | 102.06 | 102.06 | 17.01 |
| Dioctyl maleate | 235.79 | 235.79 | 39.30 |
| Triallylcyanurate | 0.32 | 0.32 | 0.05 |
| Total = | 338.17 | 338.17 | |
| INITIAL CHARGE (SURFACTANT MIXTURE) | | | |
| Water | 221.70 | | 36.95 |
| Cellosize QP-300 | 0.59 | 0.59 | 0.10 |
| Natrosol 250LR | 1.91 | 1.91 | 0.32 |
| Igepal CO-887 | 3.34 | 3.34 | 0.56 |
| Actrosol MY75 (75%) | 6.58 | 4.94 | 1.10 |
| Total = | 234.12 | 10.78 | |
| Ferrous sulfate (1%) | 0.36 | 0.00 | 0.06 |
| tBHP (70%) | 1.40 | 0.98 | 0.23 |
| tBHP (70%) | 0.53 | 0.37 | 0.09 |
| Total = | 2.29 | 1.35 | |
| GRAND TOTAL = | 600.05 | 350.30 | 100.00 |
| DOM/VA Ratio | 2.31 | | |
| Theoretical % Solids | 58.38 | | |

TABLE 7E

Quantitative Composition of Run 38

|  | Actual grams | Grams solid | Weight % |
|---|---|---|---|
| REDUCER SOLUTION (SFS DELAY) | | | |
| Sodium formaldehyde sulfoxide | 1.82 | 1.82 | 0.30 |
| Water | 26.12 | | 4.36 |
| Sodium acetate | 0.28 | 0.28 | 0.05 |
| Total = | 28.22 | 2.10 | |
| MONOMER DELAY MONOMER MIXTURE | | | |
| Vinyl acetate | 113.10 | 113.10 | 18.86 |
| Dioctyl maleate | 196.00 | 196.00 | 32.68 |
| Triallylcyanurate | 0.35 | 0.35 | 0.06 |
| Total = | 309.45 | 309.45 | |
| INITIAL CHARGE (SURFACTANT MIXTURE) | | | |
| Water | 245.70 | | 40.97 |
| Cellosize QP-300 | 0.65 | 0.65 | 0.11 |
| Natrosol 250LR | 2.12 | 2.12 | 0.35 |
| Igepal CO-887 | 3.77 | 3.77 | 0.63 |
| Actrosol MY75 (75%) | 7.31 | 5.48 | 1.22 |
| Total = | 259.55 | 12.02 | |
| Ferrous sulfate (1%) | 0.3900 | 0.0039 | 0.07 |
| tBHP (70%) | 1.5200 | 1.064 | 0.25 |
| tBHP (70%) | 0.6000 | 0.42 | 0.10 |
| Total = | 2.5100 | 1.4879 | |
| GRAND TOTAL = | 599.73 | 325.06 | 100.00 |
| DOM/VA Ratio | 1.73 | | |
| Theoretical % Solids | 54.20 | | |

TABLE 7F

Quantitative Composition of Run 32C, Scale-up

|  | Actual grams | Grams solid | Weight % |
|---|---|---|---|
| REDUCER SOLUTION (SFS DELAY) | | | |
| Sodium formaldehyde sulfoxide | 1.64 | 1.64 | 0.27 |
| Water | 23.59 | | 3.90 |
| Sodium acetate | 0.25 | 0.25 | 0.04 |
| Total = | 25.49 | 1.90 | |
| MONOMER DELAY MONOMER MIXTURE | | | |
| Vinyl acetate | 102.01 | 102.01 | 16.85 |
| Dioctyl maleate | 235.79 | 235.79 | 38.95 |
| Triallylcyanurate | 0.32 | 0.32 | 0.05 |
| Total = | 338.12 | 338.12 | |
| INITIAL CHARGE (SURFACTANT/PROTEIN MIXTURE) | | | |
| 3% Aqueous Protein Solution | 179.49 | | |
| Water | 174.11 | | 28.76 |
| FP 950 | 5.38 | 5.38 | 0.89 |
| Water make-up | 47.62 | | 7.87 |
| Cellosize QP-300 | 0.59 | 0.59 | 0.10 |
| Natrosol 250LR | 1.92 | 1.92 | 0.32 |
| Igepal CO-887 | 3.34 | 3.34 | 0.55 |
| Actrosol MY75 (75%) | 6.58 | 4.94 | 1.09 |
| Total = | 239.53 | 16.16 | |
| Ferrous sulfate (1%) | 0.35 | 0.00 | 0.06 |
| tBHP (70%) | 1.37 | 0.96 | 0.23 |
| tBHP (70%) | 0.53 | 0.37 | 0.09 |
| Total = | 2.25 | 1.33 | |
| GRAND TOTAL = | 605.39 | 357.51 | 100.00 |
| DOM/VA Ratio | 2.31 | | |
| Theoretical % Solids | 59.05 | | |

TABLE 7G

Quantitative Composition of Run 23C, Scale-up)

|  | Actual grams | Grams solid | Weight % |
|---|---|---|---|
| REDUCER SOLUTION (SFS DELAY) | | | |
| Sodium formaldehyde sulfoxide | 1.64 | 1.64 | 0.27 |
| Water | 23.60 | | 3.90 |
| Sodium acetate | 0.25 | 0.25 | 0.04 |
| Total = | 25.50 | 1.90 | |
| MONOMER DELAY MONOMER MIXTURE | | | |
| Vinyl acetate | 102.14 | 102.14 | 16.89 |
| Dioctyl maleate | 235.00 | 235.00 | 38.86 |
| Triallylcyanurate | 0.32 | 0.32 | 0.05 |
| Total = | 337.46 | 337.46 | |
| INITIAL CHARGE (SURFACTANT/PROTEIN MIXTURE) | | | |
| 3% Aqueous Protein Solution | 179.50 | | |
| Water | 174.12 | | 28.79 |
| FP 950 | 5.39 | 5.39 | 0.89 |
| Water (make-up) | 47.60 | | 7.87 |
| Cellosize QP-300 | 0.59 | 0.59 | 0.10 |
| Natrosol 250LR | 1.91 | 1.91 | 0.32 |

TABLE 7G-continued

Quantitative Composition of Run 23C, Scale-up)

|  | Actual grams | Grams solid | Weight % |
|---|---|---|---|
| Igepal CO-887 | 3.37 | 3.37 | 0.56 |
| Actrosol MY75 (75%) | 6.60 | 4.95 | 1.09 |
| Total = | 239.57 | 16.21 |  |
| Ferrous sulfate (1%) | 0.35 | 0.00 | 0.06 |
| tBHP (70%) | 1.38 | 0.97 | 0.23 |
| tBHP (70%) | 0.53 | 0.37 | 0.09 |
| Total = | 2.26 | 1.34 |  |
| GRAND TOTAL = | 604.78 | 356.90 | 100.00 |
| DOM/VA Ratio | 2.30 |  |  |
| Theoretical % Solids | 59.01 |  |  |

TABLE 15

Run 2, Vinyl Acetate Formulation with Protein 30011-118 (Contains ~1% protein)

| | Grams required (800 gram batch) | Grams solids | Supplier | Product # | Lot # | CAS# | Weight % |
|---|---|---|---|---|---|---|---|
| REDUCER SOLUTION (SFS DELAY) | | | | | | | |
| Sodium formaldehyde sulfoxide (Hydroxymethanesulfinic acid, monosodium salt dihydrate) | 2.6558 | 2.655 | Aldrich | 16351-1 | 02004AH | 6035-47-8 | 0.33% |
| Boiled HP water | 38.1766 | | | | | | 4.73% |
| Sodium acetate | 0.4103 | 0.410 | Aldrich | 241245 | 08323EE | 127-09-3 | 0.05% |
| Total = | 41.2427 | 3.0660938 | | | | | |
| Total + Tare = | | | | | | | |
| MONOMER DELAY | | | | | | | |
| MONOMER MIXTURE | | | | | | | |
| Container Tare | | | | | | | |
| VINYL ACETATE | 376.0680 | 376.068 | Aldrich | V150-3 | 10412LH | 108-05-4 | |
| Total = | 376.0680 | 376.068 | | | | | |
| Total + Tare = | | | | | | | |
| INITIAL CHARGE | | | | | | | |
| Surfactant/Stabilizer Solution With Protein (Solution 3) | 290.60 | | | | | | |
| Boiled HP water (from protein solution) | 281.88 | | | | | | 34.89% |
| Supro 710[1] | 8.7179 | 8.717 | | | | | 1.08% |
| Boiled HP water (to adjust solilds to 50%) | 77.094 | | | | | | 9.54% |
| CELLOZISE QP-300 (Cellosize ™ HEC QP300 01 Grade) | 0.9487 | 0.948 | Dow | 269424 | UC0255S6E2 | | 0.12% |
| NATROSOL 250LR (Natrosol 250LR PA) | 3.0997 | 3.099 | Hercules | | 31804 | | 0.38% |
| IGEPAL CO-887 | 5.4131 | 5.413 | Rhodia | CO-887 | MH6CR00232 | | 0.67% |
| ACTROSOL MY75(75%) | 10.655 | 10.655 | Polartech | 07-183 | | | 1.32% |
| Total = | 387.8087 | 28.8347 | | | | | |
| Total + Tare = | | | | | | | |
| FERROUS SULFATE (1%) (Iron (II) sulfate heptahydrate) | 0.5698 | 0.5698 | Aldrich | F7002 | 9614256 | 7782-63-0 | 0.07% |
| tBHP (70%) (Aliquot 1) | 1.11 | 2.222 | Aldrich | 458139 | 00112MH | 75-91-2 | 0.14% |
| tBHP (70%) (Aliquot 2) | 1.11 | 0.854 | Aldrich | 458139 | 00112MH | 75-91-2 | 0.14% |
| Total | 3.6467 | 3.64672 | | | | | |
| GRAND TOTAL = | 807.91 | 411.6155 | | | | | 100.00% |

[1]Supernatant assumed to contain ~3 weight percent protein

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

What is claimed is:

1. A method of forming a stable latex polymer emulsion having adhesive properties for bonding substrates comprising:
   providing a monomer selected from the group consisting of polymerizable acid monomers, esters, unsaturated monomers, and combinations thereof;
   mixing one or more of said monomers with water and a soy protein to form an emulsion; wherein said soy protein is provided in acidic or neutral form; and
   polymerizing said emulsion to form a latex having adhesive properties.

2. The method of claim 1 wherein said monomers are selected from the group consisting of vinyl acetate, ethylene, dioctyl maleate, acrylic acid, methacrylic acid, styrene, butadiene and combinations thereof.

3. The method of claim 1 wherein said emulsion has a solids content of from about 40 to 60%.

4. The method of claim 1 wherein polymerizing said emulsion includes adding a crosslinking agent selected from the group consisting of isocyanates, epoxies, and melamines.

5. The method of claim 1 including adding an initiator to said emulsion.

* * * * *

UNITED STATES PATENT AND TRADEMARK OFFICE
CERTIFICATE OF CORRECTION

PATENT NO. : 8,378,010 B2  Page 1 of 1
APPLICATION NO. : 12/529360
DATED : February 19, 2013
INVENTOR(S) : Browning et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 578 days.

Signed and Sealed this
First Day of September, 2015

Michelle K. Lee
*Director of the United States Patent and Trademark Office*